US009299022B2

(12) United States Patent
Buibas et al.

(10) Patent No.: US 9,299,022 B2
(45) Date of Patent: *Mar. 29, 2016

(54) INTELLIGENT MODULAR ROBOTIC APPARATUS AND METHODS

(71) Applicant: QUALCOMM TECHNOLOGIES INC., San Diego, CA (US)

(72) Inventors: Marius Buibas, San Diego, CA (US); Charles Wheeler Sweet, III, San Diego, CA (US); Mark S. Caskey, San Diego, CA (US); Jeffrey Alexander Levin, San Diego, CA (US)

(73) Assignee: QUALCOMM TECHNOLOGIES INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/468,928

(22) Filed: Aug. 26, 2014

(65) Prior Publication Data

US 2015/0324687 A1    Nov. 12, 2015

Related U.S. Application Data

(62) Division of application No. 13/829,919, filed on Mar. 14, 2013.

(60) Provisional application No. 61/671,434, filed on Jul. 13, 2012.

(51) Int. Cl.
*G06N 3/04*    (2006.01)

(52) U.S. Cl.
CPC .................................. *G06N 3/04* (2013.01)

(58) Field of Classification Search
CPC ...................................................... G06N 3/049
USPC .......................................................... 706/46
See application file for complete search history.

(56) References Cited

U.S. PATENT DOCUMENTS

2003/0103667 A1*  6/2003  Soliman ................. 382/157
2010/0312730 A1* 12/2010  Weng et al. ............... 706/15
2014/0019392 A1    1/2014  Buibas

* cited by examiner

*Primary Examiner* — Jeffrey A Gaffin
*Assistant Examiner* — Ola Olude Afolabi
(74) *Attorney, Agent, or Firm* — Seyfarth Shaw LLP

(57) ABSTRACT

Apparatus and methods for an extensible robotic device with artificial intelligence and receptive to training controls. In one implementation, a modular robotic system that allows a user to fully select the architecture and capability set of their robotic device is disclosed. The user may add/remove modules as their respective functions are required/obviated. In addition, the artificial intelligence is based on a neuronal network (e.g., spiking neural network), and a behavioral control structure that allows a user to train a robotic device in manner conceptually similar to the mode in which one goes about training a domesticated animal such as a dog or cat (e.g., a positive/negative feedback training paradigm) is used. The trainable behavior control structure is based on the artificial neural network, which simulates the neural/synaptic activity of the brain of a living organism.

9 Claims, 11 Drawing Sheets

INTELLIGENT MODULAR ROBOTIC APPARATUS AND METHODS

PRIORITY AND CROSS-REFERENCE TO RELATED APPLICATIONS

This application is a divisional and claims priority to co-pending and co-owned U.S. patent application Ser. No. 13/829,919, entitled "INTELLIGENT MODULAR ROBOTIC APPARATUS AND METHODS" filed Mar. 14, 2013, which claims priority to U.S. Provisional Patent Application Ser. No. 61/671,434 of the same title, filed on Jul. 13, 2012, each of the foregoing incorporated herein by reference in its entirety.

This application is related to co-owned and co-pending U.S. patent application Ser. No. 13/152,119, entitled "SENSORY INPUT PROCESSING APPARATUS AND METHODS", filed on Jun. 2, 2011, co-owned and co-pending U.S. patent application Ser. No. 13/152,105, entitled "APPARATUS AND METHODS FOR TEMPORALLY PROXIMATE OBJECT RECOGNITION", filed Jun. 2, 2011, co-owned and co-pending U.S. patent application Ser. No. 13/465,924, entitled "SPIKING NEURAL NETWORK FEEDBACK APPARATUS AND METHODS", filed May 7, 2012, co-owned and co-pending U.S. patent application Ser. No. 13/465,903 entitled "SENSORY INPUT PROCESSING APPARATUS IN A SPIKING NEURAL NETWORK", filed May 7, 2012, a co-owned U.S. patent application Ser. No. 13/465,918, entitled "SPIKING NEURAL NETWORK OBJECT RECOGNITION APPARATUS AND METHODS", filed May 7, 2012, co-owned and co-pending U.S. patent application Ser. No. 13/488,106, filed on Jun. 4, 2012, entitled "SPIKING NEURON NETWORK APPARATUS AND METHODS", U.S. patent application Ser. No. 13/488,114, filed on Jun. 4, 2012, entitled "SPIKING NEURON NETWORK APPARATUS AND METHODS", and co-owned U.S. Provisional Patent Application Ser. No. 61/654,738, filed on Jun. 1, 2012, entitled "NEURAL NETWORK LEARNING AND COLLABORATION APPARATUS AND METHODS", now U.S. patent application Ser. No. 13/830,398 filed on Mar. 14, 2013, entitled "NEURAL NETWORK LEARNING AND COLLABORATION APPARATUS AND METHODS", each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field

The present disclosure relates in one exemplary aspect to hardware implementations of robotic apparatus.

2. Description of the Related Art

Current controller systems for robotic devices generally fall under two design categories: controller boards and controller boxes. Controller boards generally comprise a single printed circuit board with onboard integrated circuits (processors, flash memory, RAM, etc.) and pin or other connectors for power and serial input/output. These boards can be small and lightweight, and can have light to moderate computing capabilities. However, the user is responsible for providing power and other necessary signaling to the board, and making physically secure connections that will not fail under the mechanical stress of the robotic environment.

Controller boxes offer a similar range of computing power to that of the boards, but also provide more all-in-one functionality. Boxes often provide onboard power supply/management for computational devices and external devices. Boxes may also include an onboard user interface (e.g. display and keypad).

One example of the foregoing, Arduino, is a popular open-source microcontroller board line. The Arduino board has a low performance processor and small banks of RAM and flash memory (less than 100 Kbytes). The Arduino microcontroller can be programmed through the Arduino Integrated development Environment (IDE). The Arduino IDE includes a C/C++ library that provides custom functions for setting up the functions of the microcontroller board. The provided C/C++ library ostensibly simplifies programming the microcontroller. With knowledge of microcontroller operation and an intermediate level knowledge of the C/C++ programming environment, a user may setup control functions for the Arduino microcontroller. Further, the comparatively low functionality of the hardware of the Arduino board necessitates that only the most minimal operating systems and languages can be used. Thus, two primary limitations of this environment are exposed: (i) one can readily reach the limits of the capability of the Arduino board without complex programming; and (ii) intrinsic knowledge of microcontroller programming and programming languages is required to utilize the capabilities of the board.

Other controller boards, such as the Beagle Board and Gumstix, offer more processing power and memory. However, the user is still responsible for powering/signaling the board, and engineering fault-resistant connections. Further, the increase computing power of the board requires a more complex programming environment to fully take advantage of their increased computing power, thereby increasing the skill level required for their use.

One example of a controller box is the LEGO® NXT. The NXT box is generally similar in computing performance to the Arduino board. In addition, the NXT box is offered with the LEGO Mindstorms system, which allows for programming of the NXT box via a flow-chart-based graphical programming language called the Robotic Command eXplorer (RCX) code. The RCX language allows a user to lay out their commands graphically in the program editor. The NXT box also includes battery cells able to power the on board computing devices and a number of external add-on devices such as servo motors. A user interface including a display and keypad is disposed on the outer surface of the NXT box. A user may initiate various pre-programmed routines from this interface. The battery cells (which are quite large to support the powering of servos) and on-board user interface add considerable bulk to the NXT box, when compared to the computationally similar Arduino board. The bulk limits the ability of the user to manage the form of their robotic device, as well as its capabilities.

The VEX Pro is another extant controller box, but with processing power somewhat in excess of the Gumstix board. Therefore, the VEX Pro requires a similar programming skill set to that of the Gumstix, but the integrated nature of the VEX Pro reduces the need for a user to engineer his/her own connections. The VEX Pro has both an onboard interface and onboard battery pack capable of powering servos. Thus, the VEX Pro disadvantageously has bulk similar to the LEGO NXT.

The foregoing controller boards require the user to engineer a significant portion of the robotic infrastructure. Thus, users lacking experience soldering and/or coupling of connections and working with power supplies may find these boards too complex. Controller boxes offer users an integrated option without the need to engineer such infrastructure, but are often bulky and add functionality that may be unnecessary for the user. Further, all of these systems require programming schemes that may be too complex for inexperienced users, because they either rely on text-based or graphical computing languages.

A third type robotic system foregoes central control of any type. Cubelets (manufactured by Modular Robotics, LLC) allow for a construction of a robot through the addition of cubes dedicated to a highly specific single task. Cube tasks are limited to one of simple voltage logic control operations (signal max, signal min, signal addition or subtraction), motion (wheels or rotation plates), power supply, light sensing, distance sensing, or light generation. The Cubelets do not allow for any behavioral control (i.e. no programming or software input), but rather have their operation determined by the physical arrangement of the simple logic functions of the cube. Thus, a user of the Cubelet system is limited to a single behavioral profile for any given physical configuration of the Cubelet modules.

Thus, there is a salient need for improved robotic controller apparatus and methods that require little if any engineering experience, are comparatively high in performance, and do not necessitate the inclusion of potentially unused functionality. Ideally such improved apparatus and methods would also incorporate a highly modular and interchangeable architecture.

SUMMARY

The present disclosure satisfies the foregoing needs by disclosing, inter alia, user-friendly apparatus and methods for loading and modeling artificial neural networks on extensible robotic devices.

In a first aspect, computerized neuromorphic apparatus and methods are disclosed which require little if any user skill or intrinsic knowledge to implement, thereby, inter alia, making the field of robotics and artificial intelligence accessible by literally anyone.

In another aspect, a computerized neuromorphic extensible system architecture is disclosed. In one implementation the computerized neuromorphic system architecture includes a plurality of functional modules that are configured to interact with one another while also forming a very spatially compact and lightweight form factor. In one implementation, the modules are heterogeneous in their respective capabilities; e.g., a first module is configured to provide a first function (e.g., first type of sensor), a second module a second function (second, different type of sensor), a third module a third function (power module), and so forth. In some implementations, at least some of the modules are homogeneous in function (e.g., extensible memory blocks, power cells, sensors, etc.).

In another aspect, a computerized neuromorphic apparatus is disclosed. In one implementation the computerized neuromorphic apparatus includes: (i) one or more logical mounts configured to physically secure the computerized neuromorphic apparatus inside a robotic device, (ii) a storage device configured to store at least one image file, the image file being related to a state of a neural network, (iii) a processor in data communication with the storage device, the processor configured to run at least one computer program thereon. The computer program in one implementation includes a plurality of instructions configured to, when executed: (i) access the image file, (ii) based on the image file, load a neural network in the state, and (iii) send a command to a functional module based at least in part on subsequent state evolution of the loaded neural network.

In one implementation, the foregoing apparatus comprises a modular (e.g., box-like) form factor with a plurality of signal, electrical, and/or power interfaces disposed around its periphery so as to enable physical and/or logical connection to other modules or apparatus. The box-like form factor and interface disposition advantageously allow the modules to be assembled in a number of different positions and orientations, such that a user can configure their robotic apparatus in a wide variety of shapes so as to accommodate particular uses (e.g., a very low, wide robot to fit under low overhead structures). Moreover, the box-like form factor allows for a highly spatially compact structure with extremely high spatio-functional density.

In another implementation, the functional module includes: (i) a plurality of receptacles configured to mechanically affix the functional module to a frame of a robotic device, (ii) a command interface configured to receive operational instructions from a neural network, the neural network being modeled on an substantially computerized apparatus in operative communication with the data interface, and (iii) a robotic device configured to perform a specific task. The robotic device performs at least the specific task based on at least the operational instructions received from the neural network.

In a fourth aspect, a method for use in expanding the functionality of a robotic apparatus is disclosed. In one implementation, the method includes: (i) establishing a connection to a functional module via a data interface, (ii) receiving a state file describing a mapping of an artificial neural network, and (iii) applying the mapping to a modeled artificial neural network. The act of applying the mapping to the modeled artificial neural network enables control of the functional module by the modeled artificial neural network.

In a fifth aspect, a computer readable apparatus configured to store one or more computer programs thereon is disclosed. In one implementation, the one or more computer programs include a plurality of instructions configured to, when executed: (i) load a simulated neural network onto a neuromorphic apparatus, (ii) establish connections to a plurality of robotic components via one or more data interfaces, (iii) detect an activity state of the simulated neural network related to at least an individual one of the plurality of robotic components, and (iv) transmit a command to the at least one of the plurality of robotic components, the command being based at least in part on the activity state of the simulated neural network.

In a sixth aspect, a system is disclosed. In one implementation, the system includes: (i) a neuromorphic apparatus configured to computationally model a neural network; the neuromorphic apparatus including, (ii) a functional module, and (iii) a structural hub configured to provide architectural form to the system. The neuromorphic apparatus includes: (i) a storage device configured to store one or more image files related to mappings of the neural network, each of the mappings determine a plurality of possible activity states of the modeled neural network, (ii) a first data interface configured to transmit commands based at least in part on one or more occurrences of individual ones of the plurality of possible activity states, and (iii) processing logic in operative communication with the data interface and the storage device. The processing logic is configured to: (i) load the image files to facilitate the computational modeling of the neural network, and (ii) based at least on the mappings, generate the one or more occurrences of the individual ones of the plurality of activity states. The functional module is configured to receive one or more of the commands from the neuromorphic apparatus via a second data interface. The structural hub is further configured to facilitate transmission of the one or more of the commands from the first data interface to the second data interface.

In a seventh aspect, a method of configuring a robotic apparatus is disclosed. In one implementation, the method includes: determining one or more desired functions of the apparatus; selecting a plurality of modules encompassing at least the one or more desired functions; assembling the selected modules into a desired configuration, and programming the assembled robotic apparatus in order to utilize the one or more desired functions.

Further features and various advantages will be apparent from the accompanying drawings and the following detailed description.

Figure 1:
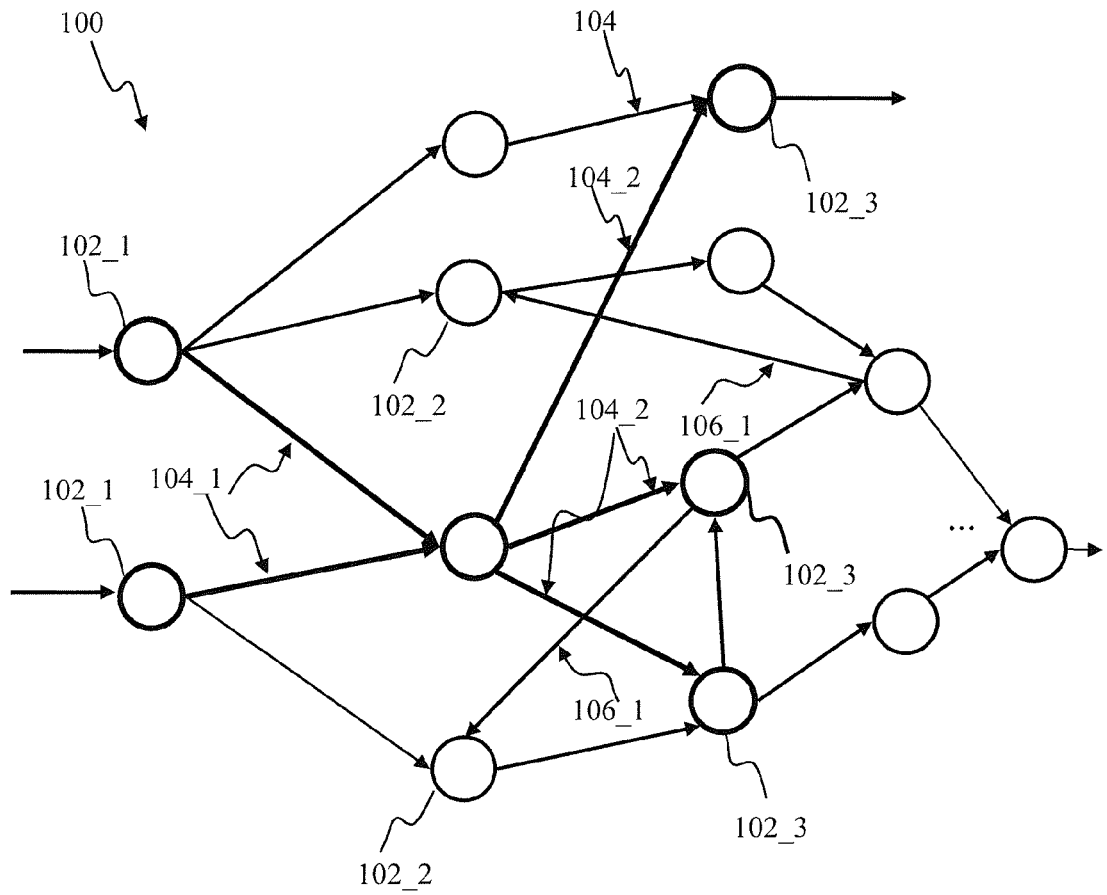
FIG. 1 is functional block diagram of one exemplary artificial spiking neural network.

All Figures disclosed herein are © Copyright 2012-2013 Brain Corporation. All rights reserved.

DETAILED DESCRIPTION

Implementations of the present disclosure will now be described in detail with reference to the drawings, which are provided as illustrative examples so as to enable those skilled in the art to practice the principles and architectures described herein. Notably, the figures and examples below are not meant to limit the scope of the present disclosure to a single embodiment or implementation, but other embodiments and implementations are possible by way of interchange of or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present disclosure will be described, and detailed descriptions of other portions of such known components will be omitted so as not to obscure the principles and architectures described herein.

In the present specification, an embodiment or implementation showing a singular component should not be considered limiting; rather, the disclosure is intended to encompass other embodiments or implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" could be optical, wireless, infrared or another type of communication medium. The exact topology of the bus could be for example a standard "bus", hierarchical bus, network-on-chip, address-event-representation (AER) connection, or other type of communication topology used for accessing, e.g., different memories in a pulse-based system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, cellular telephones, smart phones, personal integrated communication or entertainment devices, or literally any other device capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the terms "synaptic channel", "transmission channel", "delay line", are meant generally to denote a causal link between any two or more entities (whether physical or logical/virtual), which enables information exchange between the entities.

As used herein, the term "memory" includes any type of integrated circuit or other storage device adapted for storing digital data including, without limitation, ROM. PROM, EEPROM, DRAM, Mobile DRAM, SDRAM, DDR/2

SDRAM, EDO/FPMS, RLDRAM, SRAM, "flash" memory (e.g., NAND/NOR), memristor memory, and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microcontrollers, microprocessors, gate arrays (e.g., field programmable gate arrays (FPGAs)), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" refers to any signal, data, or software interface with a component, network or process including, without limitation, those of the IEEE Std. 1394 (e.g., FW400, FW800, etc.), USB (e.g., USB2), Ethernet (e.g., 10/100, 10/100/1000 (Gigabit Ethernet), Thunderbolt™, 10-Gig-E, etc.), Wi-Fi (802.11), WiMAX (802.16), PAN (e.g., 802.15), cellular (e.g., 3G, LTE/LTE-A/TD-LTE, GSM, etc.) or IrDA families.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software message representing a discrete pulsed event, and any other pulse or pulse type associated with a discrete information transmission system or mechanism.

As used herein, the term "Wi-Fi" refers to, without limitation, any of the variants of IEEE-Std. 802.11 or related standards including 802.11a/b/g/n/s/v.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, and infrared (i.e., IrDA).

Overview

As discussed above, current types of robotic control systems have limited flexibility in size, weight and architecture, in part because of the inclusion of (often unnecessary or undesired) auxiliary components in a single control box. Alternatively, barebones control boards, while offering flexibility in structure, require significant engineering skill on the part of the user to serve as the basis for a fault resistant and structurally sound robotic control system. Further, both types of control systems rely on programming paradigms that impede a user from properly programming a robotic device, because of the difficulty in conceptualizing desired behaviors of the robot within the confines of that paradigm (whether it be text-based or graphical). In other words, it may be hard for users to express the desired actions of a robot either in logical command steps (i.e. for text-based systems) or as a circuit or a flow chart (i.e. for graphical systems). Yet others require detailed knowledge of computer programming languages, thereby reducing accessibility to those without such skills.

It will be apparent in light of the present disclosure, that the aforementioned problem is readily addressed by a modular robotic device and architecture having an intuitive control system. The modular nature of the exemplary robotic system described herein allows a user to fully and particularly select the architecture and capability set of their robotic device, because the user may simply add/remove functional modules (e.g., sensors, power packs, controllers, motor drives, etc.) as their respective functions are required/obviated. Further, the connectivity between the modules of the robotic device may be implemented using interconnects designed with fault tolerances in excess of or commensurate with that needed for the expected tasks of the robotic device.

In addition, a behavioral control structure is provided that allows a user to train a robotic device in manner conceptually similar to the mode in which one goes about training a domesticated animal such as a dog or cat (e.g. a positive/negative feedback training paradigm). This advantageously allows for a broad spectrum of users to engage in robotic behavioral control, including those with little or no formal training or knowledge in robotics or computer programming. Such a trainable behavioral control structure is in one implementation based on an artificial neural network, which simulates the neural/synaptic activity of the brain of a living organism.

In one exemplary implementation, a neural network receptive to such training controls a number of operatively linked robotic components. The user may add and remove the individual robotic components as the task specific needs of the robotic device change. The neural network itself may run on one or more of the robotic components (provided they include processing capabilities). However, in various implementations, the neural network runs on computing devices remote to the robotic components.

The exemplary robotic components receive commands from the neural network based on activity states of the modeled neurons. The number and type of possible activity states is in one implementation determined based on the spatial/connectivity mapping of the neurons. The computing elements (neuromorphic apparatus) that simulate the neural network may store, load, and transfer these mappings. Thus, the "brains" of these robotic devices may be instantly rewritten, whether from a local source or a remote source. Hence, the control center of the robot may be easily altered as modules are added and removed according to the desired user application(s).

In certain implementations, the modules are constructed so as to have a minimal form factor and weight, and readily connect electrically or otherwise to other modules. The modules may also be "ruggedized", such as by being waterproof, shock resistant, heat resistant, radiation resistant, etc.

DETAILED DESCRIPTION OF THE EXEMPLARY IMPLEMENTATIONS

Exemplary implementations of the various facets of the disclosure are now described in detail. It will be appreciated that while described substantially in the context of modular robotic devices, the present disclosure is in no way so limited, the foregoing merely being but one possible approach. The principles and architectures described herein are contemplated for use with any number of different artificial intelligence, robotic, or automated control systems.

Artificial Spiking Neural Networks

Artificial spiking neural networks are frequently used to gain an understanding of biological neural networks, and for solving artificial intelligence problems. These networks typically employ a pulse-coded mechanism, which encodes information using timing of the pulses. Such pulses (also referred to as "spikes" or 'impulses') are short-lasting (typically on the order of 1-2 ms) discrete temporal events. Several exemplary implementations of such encoding are described in a commonly owned and co-pending U.S. patent application Ser. No. 13/152,084 entitled APPARATUS AND METHODS FOR PULSE-CODE INVARIANT OBJECT RECOGNITION", filed Jun. 2, 2011, and U.S. patent application Ser. No. 13/152,119, Jun. 2, 2011, entitled "SENSORY INPUT PROCESSING APPARATUS AND METHODS", each being incorporated herein by reference in its entirety A typical artificial spiking neural network, such as the network 100 shown for example in FIG. 1, includes a plurality of units (or nodes) 102, which correspond to neurons in a biological neural network. Any given unit 102 may receive input via connections 104, also referred to as communications channels, or synaptic connections. Any given unit 102 may further be connected to other units via connections 104, also referred to as communications channels, or synaptic connections. The units (e.g., the units 106 in FIG. 1) providing inputs to any given unit via for example connections 104, are commonly referred to as the pre-synaptic units, while the unit receiving the inputs (e.g., the units 102 in FIG. 1) is referred to as the post-synaptic unit. Furthermore, the post-synaptic unit of one unit layer (e.g. the units 102 in FIG. 1) can act as the pre-synaptic unit for the subsequent upper layer of units (not shown). In some implementations, the network 100 may further comprise feedback connections 108, configured to provide feedback data from higher to lower layers of the network (for example, from the neuron 102_3 of the third layer to the neuron 102_2 of the second layer, as illustrated in FIG. 1).

Each of the connections (10408 in FIG. 1) is assigned, inter alia, a connection efficacy (which in general refers to a magnitude and/or probability of influence of pre-synaptic spike to firing of post-synaptic neuron, and may comprise, for example a parameter: synaptic weight, by which one or more state variables of post synaptic unit are changed). During operation of the pulse-code network (e.g., the network 100), synaptic weights are typically adjusted using what is referred to as the spike-timing dependent plasticity (STDP) in order to implement, among other things, network learning.

In various implementations, a number of different plasticity mechanisms may be used, such as those described in co-owned and co-pending U.S. patent application Ser. No. 13/488,106, filed on Jun. 4, 2012, entitled "SPIKING NEURON NETWORK APPARATUS AND METHODS" being previously incorporated by reference herein. As discussed therein, competition is introduced among neurons, such as via heterosynaptic plasticity, in order to enable different neurons to respond to different input features. The heterosynaptic plasticity is effectuated, in one or more implementations, using at least two different plasticity mechanisms: (i) one (regular) STDP mechanism for at least one first neuron that responds to a stimulus; and (ii) a different mechanism(s) for other neurons that may respond to the stimulus. In one implementation, the at least one first neuron responds before the other neurons do, and the STDP learning rule for feed-forward connections to a given neuron is modulated by spiking activity of neighboring neurons, with which the neuron is competing for features.

Figure 2:
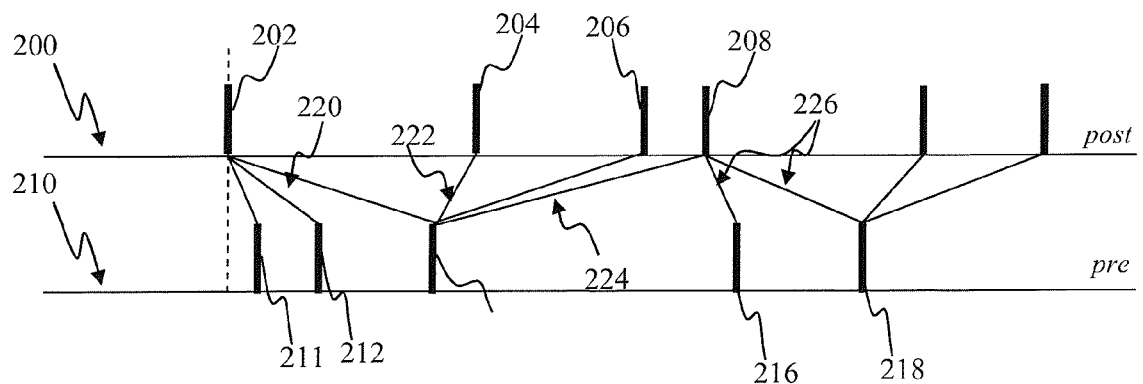
FIG. 2 is a functional block diagram of an adaptation mechanism in accord with one or more implementations.
Figure 3:
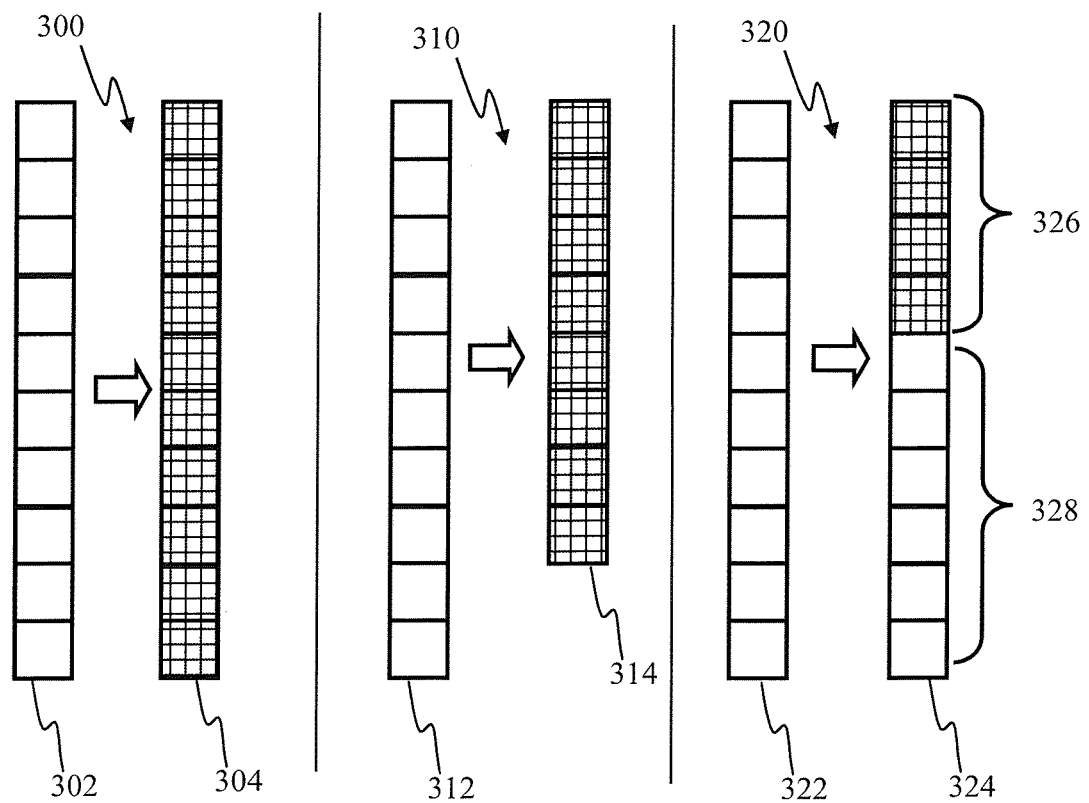
FIG. 3 is a second functional block diagram of the adaptation mechanism shown in FIG. 2.

Another such adaptation mechanism is illustrated with respect to FIGS. 2-3. Traces 200, 210 in FIG. 2 depict pre-synaptic input spike train (delivered for example via connection 104_1 in FIG. 1) and post synaptic output spike train (generated, for example, by the neuron 102_1 in FIG. 1), respectively.

Properties of the connections 104 (such as weights w) are typically adjusted based on relative timing between the pre-synaptic input (e.g., the pulses 202, 204, 206, 208 in FIG. 2) and post-synaptic output pulses (e.g., the pulses 214, 216, 218 in FIG. 2). One typical STDP weight adaptation rule is illustrated in FIG. 3, where rule 300 depicts synaptic weight change $\Delta w$ as a function of time difference between the time of post-synaptic output generation and arrival of pre-synaptic input $\Delta t = t_{post} - t_{pre}$. In some implementations, synaptic connections (e.g., the connections 104 in FIG. 1) delivering pre-synaptic input prior to the generation of post-synaptic response are potentiated (as indicated by $\Delta w > 0$ associated with the curve 302), while synaptic connections (e.g., the connections 104 in FIG. 1) delivering pre-synaptic input subsequent to the generation of post-synaptic response are depressed (as indicated by $\Delta w < 0$ associated with the curve 304 in FIG. 3). By way of illustration, when the post-synaptic pulse 208 in FIG. 2 is generated: (i) connection associated with the pre-synaptic input 214 precedes the output pulse (indicated by the line denoted 224) and it is potentiated ($\Delta w > 0$ in FIG. 3 and the weight is increased); and (ii) connections associated with the pre-synaptic input 216, 218 that follow are depressed ($\Delta w < 0$ in FIG. 3 and the weights are decreased).

Neural networks, such as illustrated in FIG. 1, are often utilized in robotic devices.

Network Training

The robotic brain may comprise one or more neural networks (e.g., the network 100), each comprising plurality of connections (e.g., the connections 104 of FIG. 1) having connection efficacy $\theta_{ij}$ associated therewith. In one or more implementations, the connection efficacy may comprise synaptic weights configured to be updated according to: reward-modulated spike-timing-dependent plasticity as follows:

$$\frac{d\theta_{ij}(t,a)}{dt} \propto R(t,a) \sum_k \eta_k(t,a) e_k(t,a) \frac{d\theta_{ij}(t)}{dt} = \eta R(t) e_{ij}(t)$$

where:
  $\theta_{ji}(t)$ is the efficacy of a synaptic connection between the pre-synaptic neuron i and the post-synaptic neuron j;
  $\eta$ is a parameter referred to as the learning rate that scales the $\theta$-changes enforced by learning, $\eta$ can be a constant parameter or it can be a function of some other system parameters;
  $R(t)$ is a function describing the reward signal;
  $e_{ji}(t)$ is eligibility trace, configured to characterize correlation between pre-synaptic and post-synaptic activity.
  a is a set of parameters that $R$, $\eta_k$ and $e_k$ are dependent upon.

In one or more implementations, a trained network or collection of networks (hereinafter also referred to as robotic brain) may be updated and/or merged in accordance with any of the methodologies described below.

In some implementations, the trained network connection efficacy map may be characterized by an efficacy vector $\Theta$ as follows:

$$\Theta = \{\theta_{ji}\} \quad \text{(Eqn. 2)}$$

where $\theta_{ji}$ is the efficacy of $i^{th}$ synapse of $j^{th}$ neuron of the network. Various methods of mapping multi-dimensional arrays into a single dimension vector exist in the arts (e.g., column-wise, row-wise, etc.).

Based on the values of $\Theta$ associated with the individual neurons, different actions occur. For example, neurons with low efficacy may be pruned. Alternatively, groups of neurons with high efficacy may be augmented with new neurons and interconnects. The more the $\Theta$ vector is used to alter the spatial state of the robotic brain, the more behavior of the robot controlled by the brain reflects the series of feedback used to generate the vector.

In various implementations consistent with the present disclosure, the robotic brain is configured to be receptive to training. The network may be capable of self-organization (e.g. the creation (destruction) of links and/or nodes to denote highly (sparsely) used pathways), unsupervised learning (e.g. practice to develop refined routines), and reward-modulated learning as discussed above.

In one or more implementations, the efficacy vector Θ may comprise a vector of trained network connection weights W (expressed in a fixed or floating point format), which are used during the network update/merge. In some implementations, the neuron state information may be updated/transferred as well. Network weight composition (also referred to as the network or brain image) may be stored (uploaded onto an external user device or cloud store), downloaded form an external source, merged with other images within the image community.

The aforementioned neural network activities (e.g. network learning) may be modeled/executed on a neuromorphic apparatus configured to host such a model, as will be discussed below.

Exemplary Apparatus
Neuromorphic Apparatus

Figure 4A:
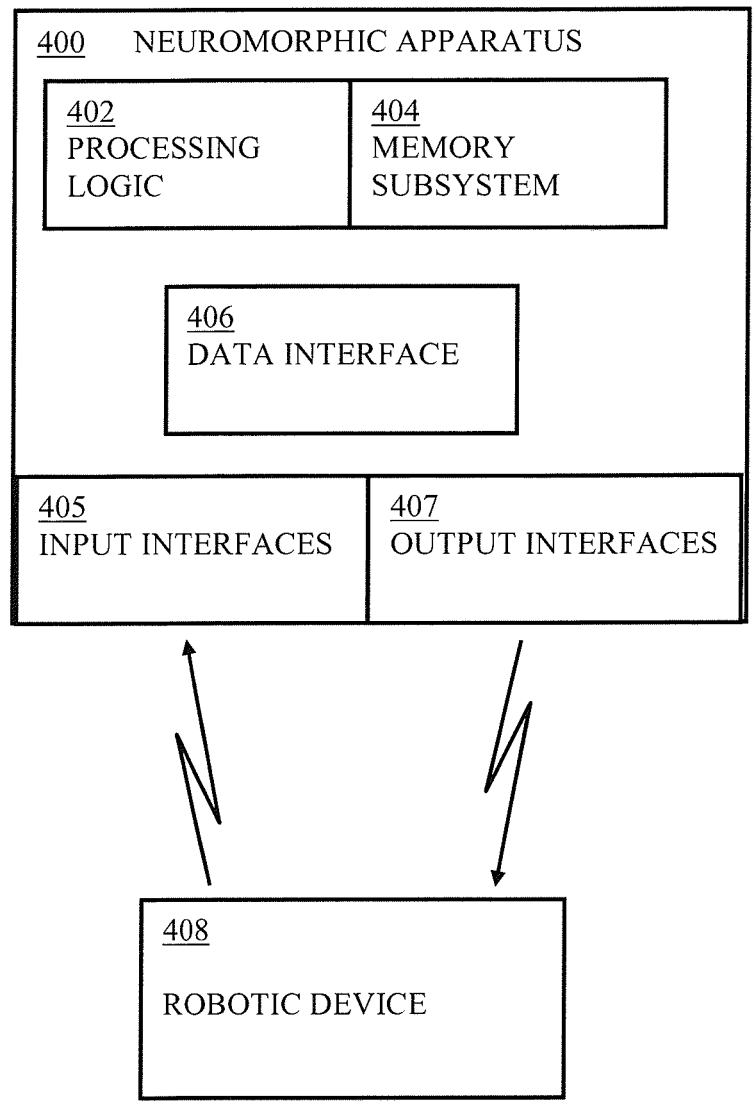
FIG. 4A is a functional block diagram illustrating a generalized implementation of a neuromorphic apparatus.

Referring now to FIG. 4A, a functional block diagram of a generalized neuromorphic apparatus 400 consistent with the present disclosure is shown. The neuromorphic apparatus serves as the "brain" of the exemplary robotic device. The apparatus comprises processing logic (e.g. digital processors, gating arrays, etc.) 402 on which the modeled neural network is run. A memory subsystem 404 is included in the neuromorphic apparatus, and is configured to support the fast memory operations (e.g., random access operations) required by the processing logic. The memory subsystem also includes non-volatile memory for storage of brain images, which are mappings of the spatial/connectivity layout of the modeled neural networks. The neuromorphie apparatus also includes a data interface 406 from which, in various implementations, it may connect to robotic components making up the robotic device 408 under its control, other neural networks, other component parts in a distributed neural network running on multiple devices, and/or computerized control devices (capable of sending commands, data, brain images, and/or feedback, etc. to the neuromorphic apparatus 400).

In some implementations, the neuromorphic apparatus may accept various inputs from the robotic device through input interfaces 405 (e.g. audio (single or multi-channel), video, touch, feedback, etc.). For example, the neuromorphic apparatus may include an interface configured to accept a reward/punishment input signal from a control device. The reward punishment interface may include a single channel on which receive such a signal (e.g. with positive and negative signaling) or the interface may include two channels (i.e. one for rewards and one for punishments). The inputs may be implemented through data interface 406 or may be separate connections. Further, as will be appreciated from the discussion of the modular aspects of the present disclosure (infra), a separate module or modules capable of input signal processing may be coupled to the device (e.g. through the data interface). These modules may be specialized for specific sensory (or other input) processing (e.g. specific modules for video, audio, pressure, and/or temperature, etc.) or able to accept multi-mode/type inputs. The input interfaces/modules may also include analog interfaces utilizing analog-to-digital converters to forward the signals on to the digital buses/ports on-board the neuromorphic apparatus 400.

The neuromorphic apparatus 400 then converts the input signals into time-domain pulse trains, which are applied to the neural network running thereon. These pulses excite neuronal activity states, which produce changes in the mapping of the neural network and/or output signals.

In various implementations, the neuromorphic apparatus may produce a number of output signals through its on-board output interfaces. In some cases, these output interfaces may also be implemented through the data interface 406. However, other implementations may include dedicated output connections. The output signals may be configured to control various components of the robotic device 408. For example, the apparatus 400 may include an output interface adapted to produce control signals for specific types of motors or actuators. In such systems, kinematic devices on-board the robotic device 408 may require specialized signal inputs (e.g. pulse/level for hydraulic devices, pulse width modulation for DC motors, serial commands ($I^2C$, RS232, SPI, etc.) for servo motors, voltage waveforms for piezos, etc.). Thus, the neuromorphic apparatus may include interfaces adapted to produce such specialized signals. However, in various implementations, a modular connectivity approach may be used. Namely, in these implementations, motor drivers can be added as separate modules similar to those discussed above with respect to input signal processing.

In some implementations, the output signals may also be configured to convey data (audio-visual signals, status information, etc.) related to the neuromorphic apparatus. For example, the neuromorphic apparatus may transmit detailed information about its current state (e.g. active neurons/connections) in a real-time feed to a remotely disposed control device. Such state information (real-time or historical) may be used by the operator of the neuromorphic apparatus to guide a training routine. Knowledge of connections and their influence on expressed behaviors of the apparatus helps a user select feedback to appropriately potentiate neurons or weight connections to achieve the desired behavioral modifications. It should also be noted that such information may also be used to guide more pointed transformations of the neural network running on the neuromorphic apparatus 400. Insertions or deletions of neurons/connections may be based on this information. Also, rules for future changes to the network may be setup (e.g. minimum activity thresholds for deletion, required activity levels for the addition of a neuron/connection, or feedback/feed-forward response levels needed to maintain a particular characteristic, etc.). Further network merges may be influenced by such information. Exemplary network merges are discussed in co-owned U.S. Provisional Patent Application Ser. No. 61/654,738, filed on Jun. 1, 2012, entitled "NEURAL NETWORK LEARNING AND COLLABORATION APPARATUS AND METHODS", now U.S. patent application Ser. No. 13/830,398 filed on Mar. 14, 2013, entitled "NEURAL NETWORK LEARNING AND COLLABORATION APPARATUS AND METHODS" previously incorporated herein by reference. As described therein, two or more parent network images serve the basis for a child image. The parent images a combined using one or more heuristics guiding selection of image aspects among the parent images. For example, such a merge may search for aspects unique to individual parents and add all such aspects to the child image.

In another example, the neuromorphic apparatus may produce audio-visual signals for output to a speaker as part of a behavioral routine. For example, the neuromorphic apparatus may be trained to produce sounds making up a song or to send a video stream (e.g. wirelessly) to screen (e.g. to display a text dialog, avatar, etc.). Indicator lights or sounds (or signals to drive such indicators) may also be used to convey status information.

In various implementations, control loops may be utilized by the neuromorphic apparatus to execute operation of various connected devices. For example, a control loop may be used to instruct a specific motor to operate for a given interval, and then stop (or reverse direction, or execute other functions such as a "stepper" motion). Control loops may be used to acquire sensory data from an attached (or otherwise linked) sensor. In some implementations, the neural network interacts with a library of control loops to translate signaling output from the neural network into signaling configured for a specific device. In some embodiments, the proper signals are generated by the network. In various implementations, processing elements associated with the connected devices run native control loops specific to the connected device. Thus, the processing requirements for signal translation (for the neural network output) are moved to the specific connected device. Hence, the neural network merely needs to "learn" to use the device, and no software elements are needed augment the neural network.

In some implementations, complex operations may be assisted through specific pre-programmed routines (examples of such pre-programmed routines include estimation loops and high-level control loops, and other pre-programmed routines). For instance, a robot may want an estimate of a relative position of itself or an object in 3-D space based on a received image. Performing such a task is complex, and may be beyond the operational capacity of a neural network of thousands or hundreds of thousands of neurons. However, such a task is well within the capability of some large neural networks (e.g. a natural human brain). To provide such complex capabilities to a more limited neural network, the network may be provided with pre-programmed routines to assist in specific complex activities (other examples of complex activities include auditory speech recognition, shape estimation from touch, and facial recognition) or high-level controls (examples of high-level controls include traveling, reorientation and basic navigation). In such implementations, the neural network may simply "learn" to interact with the pre-programmed routine. For example, a neural network may signal one or more pixels of interest from a visual sensor output. These pixels of interest may be selected based on previous training, or a specific task (e.g. "move toward green objects"). The pre-programmed routine outputs a return signal representing an estimate the distance to the pixels relative to the robot. The neural network knows the relative position of the pixels, despite lacking the capacity to perform such an estimate itself.

In various implementations, some such routines may run on the hardware that is also running the neural network, or separate hardware may be used, or combinations of the foregoing. Further, in one or more implementations, such hardware may be integrated into specific modules. For example, an image sensor module may include hardware and software to support ranging applications. In addition, some implementations use cloud computing to achieve computationally complex tasks. In such implementations, data is transmitted over a network (e.g., the Internet, a MAN, or WAN) to a server, and then processed by one or more (e.g., Internet) connected machines, and the processed output is returned. For example, for speech recognition, an audio file may be transmitted, and the return output would contain one or more recognized words (e.g. as a string, a set of spikes, or other representation of recognized words or phonemes).

To execute the various control and estimation loops, different timing scales may be maintained by various processing elements. Generally, such loops have an operating cycle duration needing a precision between 0.1%-50% of the cycle. For example, low-level control loops often run at megahertz frequencies (sub-microsecond cycle duration) and have nanosecond precision. High-level control loops may run at e.g., hundreds of hertz, and have millisecond precision. Estimation loops often address computationally complex tasks (although simple estimation tasks may be performed), and may cycle at e.g., tens of hertz or less with a precision of hundredths of seconds (or longer time scales). In various implementations, the given timescales and precisions are achieved using multiples of a high-speed processor clock. In some implementations, higher precision oscillators are used (examples of high precision oscillators include quartz oscillators, optical resonators, atomic clocks, or other high-precision oscillators).

In one or more implementations, control operations (e.g., achieved by control loops) are performed in real-time. Thus, a designated processing element may execute the control operation as called, regardless of what other functions are in process. The control operation may also cease after a predetermined interval or a given outcome triggers a stop.

In some implementations, estimation operations are informational and may be on-going, or may not have a specified interval of operation. In addition, estimation operations may lack a specific period in which they are to be completed. For example, the period for completion may be dependent on the complexity of a specific instance of estimation and not set by external request. In another example, the period of operation may be delayed until resources are available to perform the estimate. In one or more embodiments, estimation operations may be implemented in real-time. For example, an operation may be configured run one or more loops over a given interval and then terminate.

In various implementations, the neuromorphic apparatus 400 utilizes one of a number of storage/processing architectures to support execution of the neural network model, such as those discussed in co-owned and co-pending U.S. patent application Ser. No. 13/488,114, filed on Jun. 4, 2012, entitled "SPIKING NEURON NETWORK APPARATUS AND METHODS" previously incorporated by reference herein. As described therein, a plurality of processing blocks (micro-blocks) are stored, and each micro-block comprises a computing logic core and a memory block. The logic core is configured to implement various aspects of neuronal node operation, such as the node model, and synaptic update rules (e.g., the I-STDP) and/or other tasks relevant to network operation. The memory block is configured to store, inter alia, neuronal state variables and connection parameters (e.g., weights, delays, I/O mapping) of connections.

The neuromorphic apparatus is configured to load a neural network model based on one or more brain images. The neuromorphic apparatus may load such images from those stored in its local memory subsystem 404, or it may utilize its data interface 406 to obtain a brain image from a remote or connected source. This source may include for instance a computing device (e.g. PC or smartphone) with a direct link to the neuromorphic apparatus, or it may include a server access via the Internet or via an intermediary computing device. Repositories and sharing sites for brain images are described in co-owned U.S. Provisional Patent Application Ser. No. 61/654,738, filed on Jun. 1, 2012, entitled "NEURAL NETWORK LEARNING AND COLLABORATION APPARATUS AND METHODS", now U.S. patent application Ser. No. 13/830,398 filed on Mar. 14, 2013, entitled "NEURAL NETWORK LEARNING AND COLLABORATION APPARATUS AND METHODS" previously incorporated herein by reference. As discussed therein, users may access brain images such as e.g., shared by other users on repositories designed to house archives of brain images. Users may browse the brain images based on the capabilities and trained functions of the brain images. Uploading to the repositories is also supported. Users may upload the images directly from their active neuromorphic apparatus or they may upload via an intermediary computing device. Such image replacements or the merges/alterations, discussed supra, allow for simple dynamic behavioral modification of a neuromorphic apparatus. By contrast, conventional software programming based robotic control paradigms are not readily adapted in this manner.

The neuromorphic apparatus 400 may be implemented in differing physical configurations. In some implementations, the neuromorphic apparatus comprises a stand-alone processing unit running an independent neural network. Such implementations may be used in, for example, autonomous robotic systems with onboard control centers. In some implementations, the neuromorphic apparatus may be disposed on a computer separate from the robotic system 408 which it controls. For example, a laptop computer or PC or handheld computer may be configured to serve a neuromorphic apparatus in control of a robotic device with which it is in data communication (e.g. wirelessly, over a serial data connection, via a network). In various implementations, the neuromorphic apparatus may be distributed across a number of networked computing devices (e.g. cloud, cluster, etc.). In these distributed implementations, the neuromorphic apparatus may communicate directly with robotic device it controls via the internet, or an intermediary computing device (e.g. PC, smartphone, tablet, etc.) maintains the link.

Figure 4B:
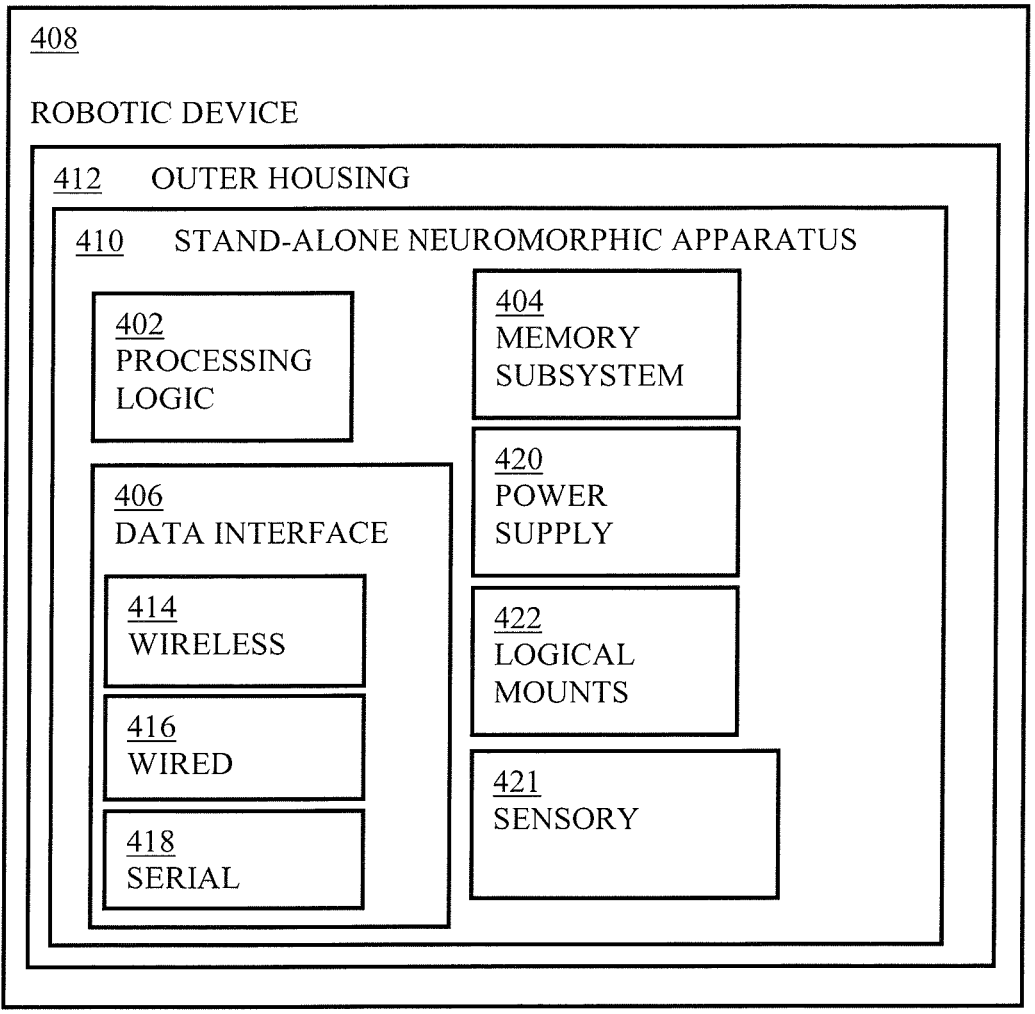
FIG. 4B is a functional block diagram illustrating one implementation of a stand-alone neuromorphic apparatus.

Referring now to FIG. 4B, a functional block diagram of an exemplary implementation of a stand-alone neuromorphic apparatus 410 is shown. The stand-alone apparatus has an outer housing 412, with various ports on its outer faces. The outer housing provides protection to the apparatus, and may be made from different materials depending on the intended application of the robotic device it controls (as discussed below). In some stand-alone implementations, the data interface 406 may comprise a one or more of a wireless interface 414 (e.g. Wi-Fi, Bluetooth, and/or cellular data, etc.), a wired network connection 416 (e.g. Ethernet or GbE), and serial data connections 418 (e.g. USB, eSATA, Firewire, Thunderbolt, etc.). The wired and serial data connections may be included in the ports disposed on the outer surface of the housing. It will be appreciated that, though industry standard ports may be used, the ports may be modified (relative to industry standards) to support operation of the robotic device (e.g. ruggedized, integrated into other structural elements, etc.). For example, in one implementation, the ports include the standard number of terminals in a USB system (e.g., 4) so as to maintain the functionality thereof, yet the actual connector does not comply with USB connector specifications, and is instead configured so as to provide ease of physical mating of the modules, such as where the connector is configured in a round form with flat contact pads as opposed to pin terminals as in a traditional USB connector.

Moreover, it will be appreciated that the connections or interfaces used on the apparatus 400, 410 may be wireless in nature, such as for instance inductive (for inter alia, signaling/data transfer, or even inductive power transfer), capacitive, optical (e.g., a light source and light receptor), etc. The interfaces (and in fact the rest of the module apparatus 400, 410) may be ruggedized if desired, such as by being made water resistant or water proof, heat resistant, radiation resistant (such as via indigenous alpha/beta particle or gamma ray shielding), shock/g-force resistant, etc. as dictated by the particular application.

In the case that the wireless network connection includes more than one protocol capability (e.g. Wi-Fi and Bluetooth), wireless coexistence strategies may be invoked to ensure optimal performance. For example, a time division multiple access arbitration scheme may be adopted to ensure that only one wireless protocol transmits at any given time and does not interfere with the others. In one implementation, two communications interfaces operational in the same band (e.g., ISM band at 2.4 GHz) communicate via the controller (or directly to one another via the module interfaces) so as to implement such co-existence, so as to mitigate interference.

A power supply system 420 may also optionally be included in the stand-alone apparatus. As will be discussed below, the power supply systems of an entire robotic device may be expanded; therefore, the power supply system included within the housing of the neuromorphic apparatus need only match the needs of the systems disposed within the housing (e.g. processing logic, memory subsystem, connectivity, etc.). Other devices on the robot 408 may have their power needs met by expansion systems. However, it will be appreciated in systems with reduced constraints (e.g. for weight, size, mobility, etc.), power needs may be met by a single supply system (which itself may comprise a "module"; e.g., one or more power supply modules such as rechargeable batteries, which can be electrically disposed in series so as to create a desired voltage level, such as e.g., six (6) 2V DV cells in series to make a 12V battery). For example, a small hobbyist robot may utilize several small battery-based power modules to meet its exact needs without violating its architectural constraints. On the other hand, an autonomous building environmental control unit may simply tap into the building's power grid. Any power supply elements know to those skilled in the arts may be used to construct the power supply system (e.g. batteries, AC adapters, rectifiers, switching units, transformers, DC sources, etc.). In some implementations, the neuromorphic apparatus may comprise a sensor block 421 implemented within the same PCB and/or cube (e.g., 430, 450 in FIGS. 4C and 4D). In one or more implementations, the sensor block may comprise inertial sensor (e.g., accelerometers, gyros), heading, internal and/or ambient temperature, altimeter/range, barometric pressure, etc.).

The outer housing of the neuromorphic apparatus 410 may be fashioned out of a variety of materials. The material may be selected based on the intended application of the robotic device 408 controlled by the neuromorphic apparatus. For example, for robotic devices for use with interlocking block or toy engineering kits (LEGO®, K'Nex®, Mega Bloks®, etc.), the outer layer of the device may be a common plastic (e.g. high-density polyethylene) for ease of integration with exiting blocks (harder materials may wear on the existing blocks, softer materials may themselves wear) and low cost. However, for example, in military or industrial applications, a hardened system (or one with other desired properties) may be more appropriate and a material such as titanium, composite, ABS, etc. may be selected for the outer layer.

In some implementations, the outer surface of the housing includes numerous physical mount points 422 (e.g. hooks, bosses, grooves, depressions, screw holes, etc.) for integration of the neuromorphic apparatus into the robotic device and/or its surrounding environment. In various ones of these implementations, these mounts may include pitch for interconnection with extant interlocking block configurations such as those used in LEGO and Mega Bloks® construction sets. In some implementations, magnets may be used to physically support a device in place of friction-based fasteners and/or receptacles. Magnets offer physical stability, but do not degrade if the mount is forcefully broken (e.g. similar to MagSafe® power adapters). In various implementations, pairs of threaded holes and through-holes may be used to secure the apparatus with e.g., bolts or other types of fasteners. In some implementations, the through-holes are counterbored such that the bolt sits flush with the surface of the apparatus 400. Combinations of the foregoing may also be used. For example, in implementations in which a bolt head does not sit flush with the surface of the apparatus, it may serve as pitch for connection to another device.

Further, in some implementations, these mount points 422 may provide function beyond structural support and integration—they may double as data or power ports. For example a standard serial data port may be used as a mount for the neuromorphic apparatus. Alternatively, in another example, contacts may be added to regular LEGO pitch (or other interlocking receptacle) to create a data/power port. Inductive coupling may also be used to create contact free ports (e.g. no metallic contact plates or rods). Using such coupling, data or power may be transmitted though an insulating outer layer from coils below the layer. Such ports may be engaged by magnets disposed under the insulating layer. The magnet may be used to pull a switch into the active position when the connector is in place (the switch remains inactive otherwise).

In some implementations, to provide orientational flexibility, the placement and number of mounts 422 and serial/power connectors on the surface of the neuromorphic apparatus 410 may observe one or more symmetries (e.g. chiral, reflection, rotation, inversion, etc.). Thus, a user may mount the neuromorphic apparatus in an increased number of orientations. Orientations that would result in improper serial/power connection may be made to be physically incompatible with the placement of the mounts. In some implementations, the position of serial/power contact may be allowed to change once the apparatus has been mounted (or during the mounting process). For example, serial/power contact may be placed on a rotating plate that automatically moves into the proper orientation for the selected mounting position. The rotating plate may be moved into position in various ways, such as by a servo motor, or by forced rotation to anti-align the poles of two magnets.

Figure 4C:
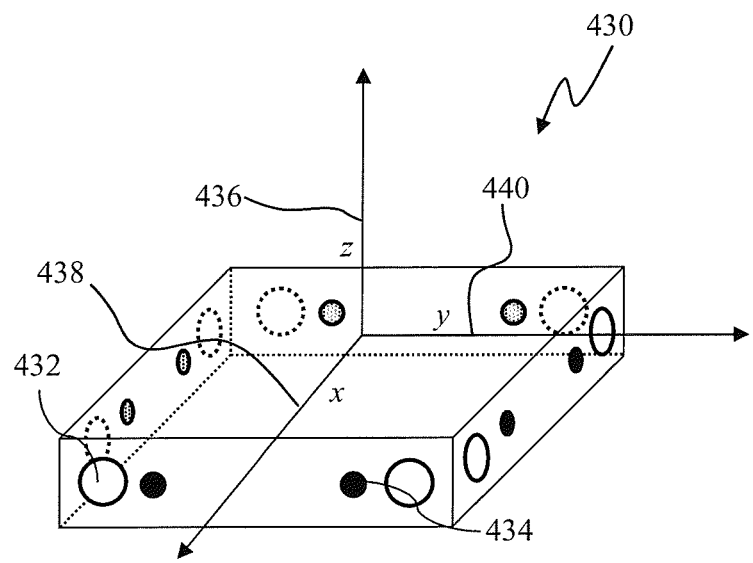
FIG. 4C is a top perspective view of one implementation of a placement-insensitive functional module apparatus.

In one implementation of the foregoing, the apparatus 430 is configured such that it is completely non-chiral (i.e., has no "handedness", such that it can be placed in any orientation yet produce the same result) with respect to at least two dimensions. For example, as shown in FIG. 4C, the apparatus 430 may be square (i.e., sides of two faces each having the same length and width dimensions A, with the remaining four faces each having rectangular sides of length A and B, with B being different than A). Interfaces (here, exemplary first data interfaces 432 and second power interfaces 434, although each of the interfaces can be of any type such as mechanical, optical, etc.) are disposed at each of the sides of each rectangular surface in mirror image disposition to those at the other side of the same rectangle, for a total of eight (8) data interfaces and eight (power) interfaces on the apparatus 430. In this fashion, the apparatus 430 can be (i) rotated around its Z axis 436 (an arbitrary frame of reference) in 90-degree increments, and/or (ii) rotated around either its X or Y axis (438, 440) in 180-degree increments, while maintaining identical data/power interface placement. Stated differently, the power and data interfaces 432, 434 will always be disposed at the same place and in the same relationship to one another regardless of the orientation of the apparatus 430 (within the foregoing angular limitations).

In another implementation (FIG. 4D), the apparatus 450 is cube-shaped, with all sides of all surfaces being equal in length (A). In this implementation, the data and power interfaces 432, 434 are disposed symmetrically with respect to each corner of each surface, in mirror image with respect to the others of the same surface as shown. In this fashion, the cube is completely insensitive to orientation, and is non-chiral (again, within the angular limitations of rotation of 90 degrees around any Cartesian axis oriented normal to the faces of the cube).

Figure 4D:
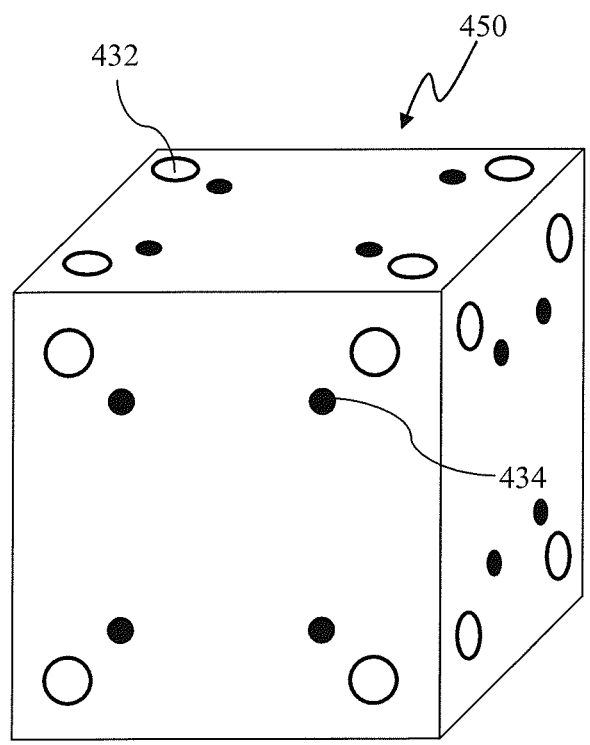
FIG. 4D is a top perspective view of a second implementation of a placement-insensitive functional module apparatus.
Figure 4E:
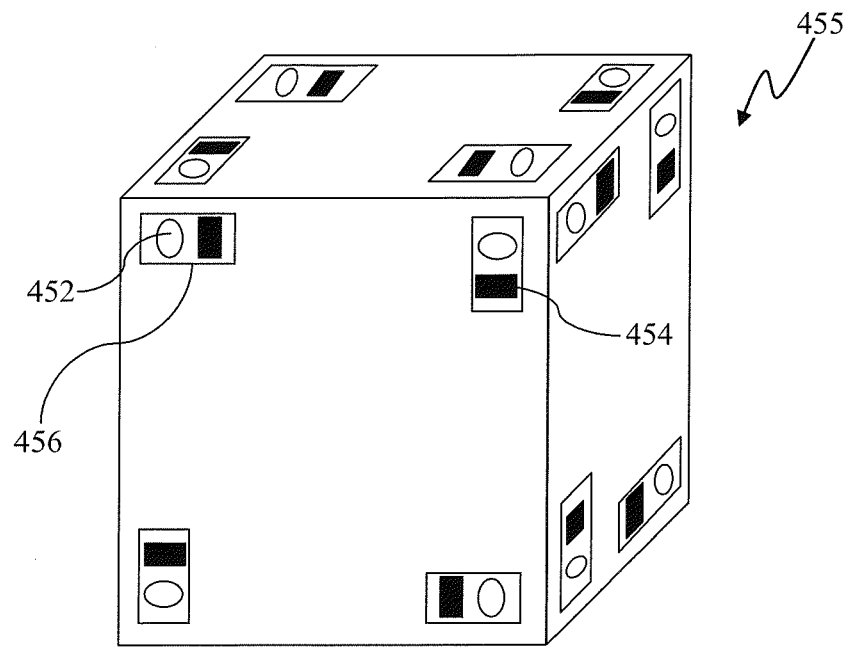
FIG. 4E is a top perspective view of a third implementation of a placement-insensitive functional module apparatus.

An exemplary implementation 455, shown in FIG. 4E, also demonstrates 90-degree rotational symmetry about any Cartesian axis normal to its faces. However, it uses a joined data 452 and power 454 connector 456 that is rotated a quarter turn as one moves from corner to corner. Thus, the implementation has a specific chirality, which could be inverted by rotating all of the combined ports 456 180 degrees, but still exhibits a rotational invariance that allows it to have aspects of the placement insensitivity discussed above with respect to non-chiral designs (e.g. 430 and 450). It should be noted that as long as all the ports are rotated by the same absolute amount relative to their current positions a design with similar rotational invariance (90 degrees about a facial normal) results.

The foregoing implementations of FIGS. 4C, 4D and 4E provide the distinct advantage of user placement-insensitivity (to varying degrees); in this way, a user can more readily mate the modules 430, 450, and 455 with other modules with having to worry about how they fit together to maintain the desired electrical, signal, and/or mechanical connections.

Figure 4F:
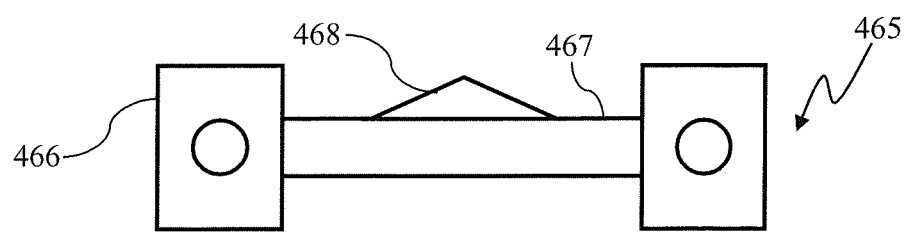
FIG. 4F is a functional block diagram illustrating one implementation of a neuromorphic apparatus wide corner elements.

Referring now to FIG. 4F an exemplary implementation of the neuromorphic apparatus 465 is shown in which the corner elements 466 of the apparatus are wider than the central portions 467. The central portions 467 containing heat generating computing elements. The mount points for the apparatus are disposed on the corner elements. Thus, in some implementations, an air gap is created between the neuromorphic apparatus and the devices on which it is mounted. This air gap may facilitate cooling simply through its presence alone, or alternatively heat dissipation structures/devices 468 (fins, sinks, fans, liquid cooling systems, etc.) may be disposed in or proximate to the gap to further aid in cooling. In some implementations, the corner elements 468 are configured as sub-modules separate from the neuromorphic apparatus 465. In these implementations, the corner elements may be removed should a user's design not necessitate an air gap or cooling structure. For example, a user may assemble a robotic device with a dedicated cooling system obviating the need for the wide corner sub-modules. These separated sub-modules may be configured to pass data and power to the neuromorphic apparatus.

Figure 4G:
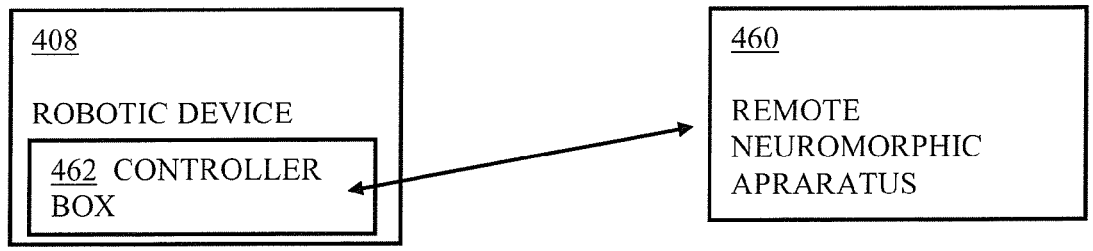
FIG. 4G is a functional block diagram illustrating exemplary operation of a remote neuromorphic apparatus consistent with one or more implementations.

In some implementations, the neuromorphic apparatus is housed on a computing device remote from the robotic device 408 it controls. Referring now to FIG. 4G, a functional block diagram illustrating an exemplary system with such a remote neuromorphic apparatus 460 is shown. In these implementations, the neuromorphic apparatus establishes a remote link (e.g. via a wireless or wired network connection) to a controller box 462 disposed on the robotic apparatus 408 that accepts command input from the remote link. It will be appreciated by those of skill in the art that the functions of the controller box 462 may be performed by another neuromorphic apparatus. For example, a "master" neuromorphie apparatus may run on a stationary (semi-stationary) computing system (e.g. laptop, desktop PC, supercomputer, etc.) and a subsidiary neuromorphic apparatus may be disposed directly on the robotic apparatus. The master neuromorphic apparatus in one implementation relays commands to the subsidiary via the remote link. In this example, the system is such that a computationally superior neuromorphic apparatus may control a lesser one, but the lesser still maintains local intelligence, and may maintain operation even if the remote link is broken.

Alternatively, the functions of the controller box 462 may be performed by a "thin" client, with minimal hardware capabilities. This thin client controller may be functional only to accept commands for the on-board devices associated with the robotic apparatus 408, and relay data from onboard devices back to the remotely disposed neuromorphic apparatus 460. The thin client is unable to operate without support from the remote neuromorphic apparatus. However, controllers with more expansive hardware capabilities may be easily adapted to perform the functions of the thin client controller box.

In some implementations, the remote neuromorphic apparatus 460 may be disposed on a command robotic device. For example, a neuromorphic apparatus in control of an autonomous passenger vehicle may serve as a control center for smaller scale robotic devices. In these implementations, the remote apparatus 460 may support many of the features discussed above with respect to the stand-alone apparatus 410.

In some implementations, the remote neuromorphic apparatus 460 may comprise a distributed computing system (e.g. cluster, cloud, etc.). In these implementations, the neuromorphic apparatus is not disposed on a single computing device, but rather a collection of networked computing devices cooperatively executing portions of the neural network model. Such architectures allow for more neural networks of arbitrary complexity, because a user may simply add more processing hardware to the distribution. In these implementations, the execution of the neural network may be parallelized for optimal execution on multiple processing cores.

In one implementation, such a distributed architecture may comprise computing elements disposed on several robotic devices 408 all sharing a single collective neural network. Each computing element provides a portion of the processing cycles or functionality necessary to simulate the neural network, and the sum of their simulations controls each of the robotic device like an additional appendage. The individual computing elements may be networked via any of the wired, wireless, or serial connections available on the devices.

In one or more implementations, the distributed computing elements may include computing expansion modules on a single robotic apparatus. Though this implementation is architecturally distinct from the above "collective mind" implementation, it is similar in that multiple computing onboard elements constitute a single mind.

In various implementations of the distributed model, the remote neuromorphic apparatus comprises a stationary computer cluster. The robotic devices are controlled in a similar fashion to the collective mind, but the computing elements are not actually disposed on the robotic devices. Connectivity may be achieved through controller elements (with networking or serial capabilities) on the robotic devices.

Cloud computing models may also be used consistent with the disclosed principles and architectures. In these implementations, the robotic device uses internet or intranet (e.g., wide area network) connectivity to receive control instructions from a neural network being simulated on one or more servers. In some cases, the servers used may be interchanged with other servers with similar hardware (e.g. one server might be replaced with multiple servers with collectively equivalent hardware). In some aspects, a service provider may allow a user to purchase or otherwise obtain time on properly configured servers to run their neural network. Thus, the user may be able to simulate a more complex neural network than that possible on their own hardware, without putting forth the full capital investment needed to purchase the equivalent computing power. For example, per-use or subscription models may be used for revenue generation by the service provider. It can also be appreciated that the user may be charged in proportion to the number of processor hours used in the neural network simulation, or according to some other metric.

Other cloud models may also be used. It is envisioned that a group of users may wish to pool their hardware capabilities to simulate a single neural network, and other user may simply want to donate CPU clock cycles to such an endeavor. Thus, models for voluntary distributed computing may be used consistent with the disclosure (e.g. SETI@home, folding@home, BIONIC, etc.).

Functional Modules

Figure 5:
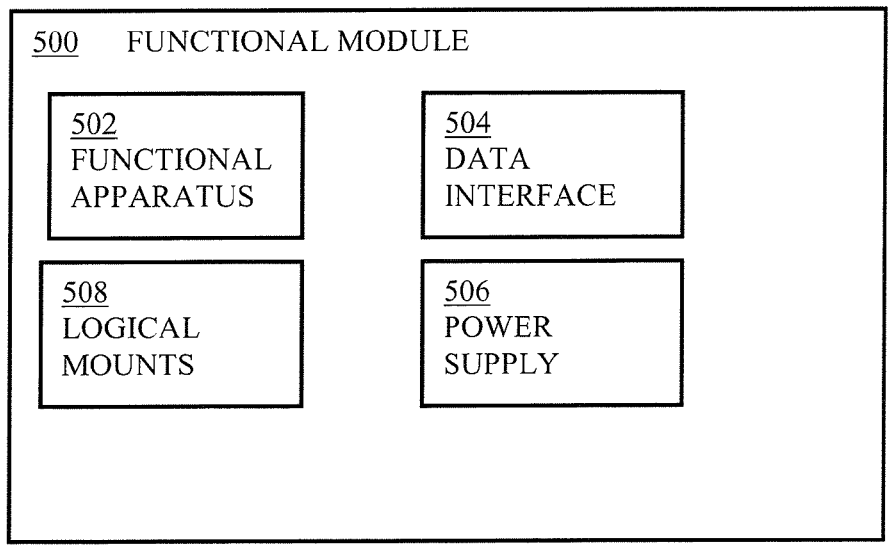
FIG. 5 is a functional block diagram illustrating one implementation of a functional module.

Referring now to FIG. 5, a functional block diagram illustrating a generalized functional module 500 is shown. The exemplary implementation of the robotic device 408 is designed such that modules with specific capabilities may be added and removed from the robot. Thus, the user may easily control both the structure and capability of the robotic device. In general, functional modules each include: (i) a functional apparatus 502 tailored to their specific function, (ii) a data or signal interface 504 to allow a link to be established with the neuromorphic apparatus 400 controlling the robotic device, (iii) a power system or interface 506, and physical mounts 508 for physical integration into the robotic device.

The data interface 504 may include for instance a data serial connection or a wireless networking interface. Further, the data interface may be integrated into the physical mount using the architectures discussed above with respect to the stand-alone neuromorphic apparatus 410. The functional module may send and/or receive data over its data interface depending on its function and design. For example, a particular sensor module may only transmit data to the neuromorphic apparatus, but a servo motor controller may only receive commands from the neuromorphic apparatus. In some implementations, rather than supporting raw data transfer between the neuromorphic apparatus and the functional module, a software abstraction layer is used (e.g. drivers rather than direct commands/raw sensor output). In these cases, the functional model identifies itself for proper driver configuration, and two-way data transfer is supported. For example, in a "plug-and-play" system (which may be supported by the neuromorphic apparatus) such two-way data communication is used even in cases where only one way commands are necessary for the general operation of the functional module.

The power requirements of the functional module are managed by its power supply system or interface 506. In some functional modules, this may comprise a simple dc (direct current) input port, and may be supplied over a serial connection. In other modules, an on-board battery may be present to meet the power requirements of it specific functional task. Some modules may themselves be power supply systems for other modules. These modules may include components such as battery packs, solar cells, and a dc source to support the power needs of the other modules.

The physical mounts 508 of the functional modules allow for, inter alia, the structural integration of the functional module into the form of the robotic device 408. As discussed above with respect to the neuromorphic apparatus, the mounts 508 may include physical structures (e.g. hooks, bosses/depressions, grooves, screw holes, etc.) capable of securely positioning the functional module within the robotic device. Magnetic mounts points may also be used in addition to or in lieu of the physical structures. Further, in some implementations, the mounts 508 are operative to provide data/power transfer to and/or from the functional module. Architectures similar to those discussed with respect to the stand-alone neuromorphic apparatus may be used to serve as the multi-purpose mounts in these implementations.

The functional apparatus 502 on board the module 500 in the exemplary implementation defines the purpose of the module. Consistent with the present disclosure, the function provided by this apparatus may vary from module to module; thus enabling the extensible nature of the robotic device 408. However, it will also be appreciated that two or more discrete or related functions may be combined or integrated into a single module if desired, especially in cases where the combination provides some synergy in terms of space, power consumption, processing speed, heat dissipation, etc. For example, in order to minimize 12R losses, it may be useful to combine a power supply (e.g., battery) with a high-draw power sink (e.g., a motor assembly). As another example, it may be useful to combine a high heat-generation component (such as a microprocessor or rechargeable battery) with a component capable of dissipating heat (e.g., a structural member capable of acting like a heat sink).

In various implementations, the module functions include, without limitation, computational power expansions (processing and memory), power supply modules (e.g. battery packs, capacitor banks, dc sources, etc.), servo motor control (e.g. for wheels, appendages), pneumatics, hydraulics, machine vision systems (e.g. Xbox® Kinect), CCDs, CMOS sensors, photodiodes, color sensors, heaters/coolers, temperature sensors, ranging and detection systems, LEDs, missile guidance systems, weapon control systems or any of a host of other robotic functions known by those skilled in the arts. The user then may select among these modules and create a robotic device specific to the user's needs/desires (and any physical or other limitations imposed by the particular intended application, such as dimensional or weight limitations).

The functional modules 500 are in the exemplary implementation configured to interact with the neuromorphic apparatus ("brain") via the power and/or data interfaces onboard the modules. However, the modules may further interact with each other. For example, in some cases, the neuromorphic apparatus may not include battery power sufficient to run high drain devices for periods of time specified by a user's design needs. Thus, power supply expansion modules may be used to supplement (and in some cases supplant) the power supply capabilities of the neuromorphic apparatus. In doing so, the power supply may interact directly with other modules in both supplying power and accepting data requests for power. In another example, computing expansion modules may interact among themselves to support the modeling of a neural network larger than any one of the modules is capable of modeling themselves. In this case, in order to effectively control the other modules the expansion modules may be able to establish connections with the other functional models. Thus, the bandwidth channels available for peripheral control may be expanded along with computing power.

Further, in some implementations, the functional modules are designed to be mounted on standardized connection points. Using these standardized points, a user may interchange on functional module with another (positioning wise) or with non-functional units (e.g. a normal interlocking block or set of blocks). Thus, a user may freely spatially reconfigure the modules (and neuromorphic apparatus 400, if on-board the robotic device 408). For example, in systems based on an exemplary use of interlocking blocks, the user may redesign and rebuild various configurations freely substituting functional parts similar to the fashion one might with ordinary plastic blocks. Thus, the system achieves similar design freedom enjoyed by users of systems such as LEGOs. K'Nex, and Mega Bloks, yet is also provided expanded functional capability, enhanced use of space and weight, and greatly enhanced ability to program or "teach" the apparatus.

Skeletal Hubs

In some implementations, the robotic device 408 may be provided with architectural form through the use of skeletal hubs or frameworks. Skeletal hubs in one implementation provide a selection of bays and mount points for various ones of the functional modules and neuromorphic apparatus; i.e., a skeleton that provides shape to the robotic device. In various ones of these implementations, the bays and mount points provide access to a hub(s) internal to the skeleton the provide data/power connectivity among at least some of the functional modules affixed in the bays/mount points.

In some implementations, the skeletal hub may provide overall form to a robotic device. For example, a skeletal hub shaped like a dinosaur may provide a bay for a neuromorphic apparatus in the head of the dragon shape, a bay for a power supply expansion in its chest cavity, mount points for CMOS/CCD video sensors in its eye sockets, and mount for servo motors on the dinosaur's arms and legs. The bays need not be function specific, in the above example, the user may opt to exchange the placement of the neuromorphic apparatus and the power supply, and substitute ultrasound transducers/sensors (e.g. for sonography or echo-location) for the CMOS/CCD cameras. Thus, the skeletal hubs need not necessitate a specific design.

In various implementations, the skeletal hub may provide form to a specific component of the robotic device. For example, a skeletal hub may supply the structure of a single appendage (e.g. arm, leg, hand, etc.) of a robotic device. In these implementations, the skeletal hub provides similar bays mount points to assist in the assembly of the component. In the appendage example, bays near joints in the appendages allow for motion control or a mount point on the end of the appendage may allow for the creation of a posable probe.

In some cases, skeletal hubs may not be completely devoid of included functional units. Without limitation, any/all of the above discussed functional modules may be integrated into a skeletal hub. Further, skeletal hubs need not be similar in appearance/structure to an endoskeleton (e.g. beams and joints), exoskeleton-type (e.g. full exterior appearance) hubs may be used.

The size scale of the skeletal hubs, functional modules 500, and neuromorphic apparatus 400 may change with the intended application of the robotic device. The neuromorphic apparatus itself may vary in size from a single integrated board or ASIC millimeters in diameter (e.g. with a processor and memory) up to a distributed network of computers. Even an on-board neuromorphic apparatus may be quite large (e.g. the size and weight of several desktop PCs, such as system might be on-board an autonomous vehicle.). The function modules clearly vary in size depending on their function. It can be appreciated that a car engine functional module will be the size of a car engine, and a camera sensor functional module may be, at a minimum, roughly the size of the camera sensor. Any skeletal hub used with such modules and apparatus must also be appropriately scaled (i.e. on a scale with the largest include functional module).

Moreover, while the foregoing implementations describe a skeletal hub or framework, it will be recognized that many different types and implementations of robotic device may be formed without the use of such hubs or frames. For example, it is contemplated that the various module apparatus 500 discussed supra may have sufficient mechanical rigidity (e.g., by virtue of the physical interfaces 508, interlocking joints, ribs, magnets, etc. such that a skeletal frame is not required, thereby also advantageously reducing the weight and bulk of the robotic apparatus.

Exemplary Methods

Figure 6:
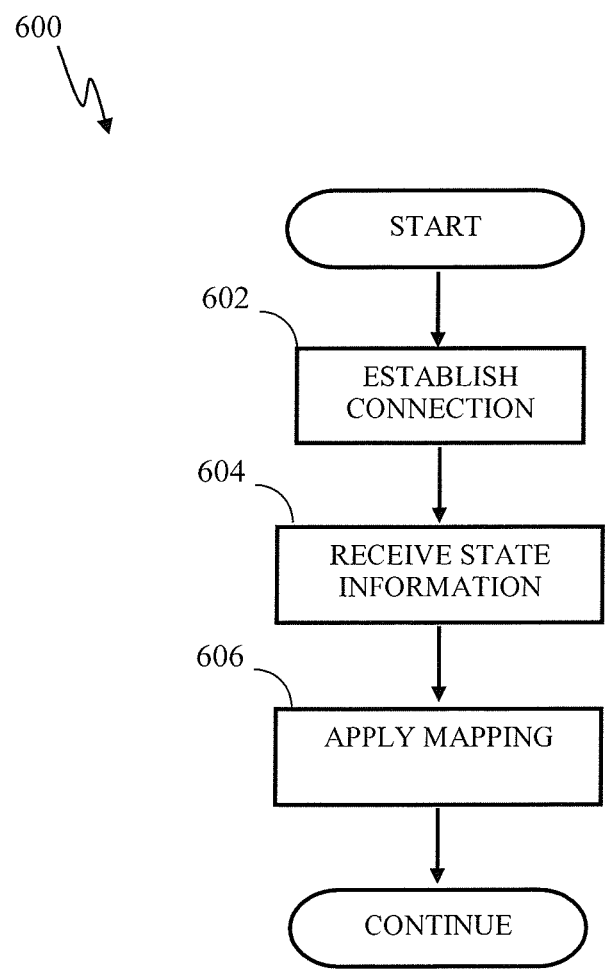
FIG. 6 is a logical flow diagram depicting a generalized method for expanding the functionality of a robotic device consistent with various implementations.

Referring now to FIG. 6, a flow chart illustrating one implementation of a generalized method 600 for expanding the capability of a robotic device is shown. The method allows for the establishment of connection/control between a neuromorphic apparatus 400 and a functional module 500.

At step 602, the neuromorphic apparatus establishes a connection to a functional module. The connection may comprise a power connection and/or a data connection, and may be established through the data interface 406 and/or power supply connectivity. The connection may be initiated by either the functional module or by the neuromorphic apparatus depending on the functionality of the module and the configuration of the neuromorphic apparatus.

Further, the connection may be facilitated by one or more intermediary devices/software layers. For example, the neuromorphic apparatus may be remotely disposed from the robotic device on which the functional module is disposed. In this case, the connection is relayed through a controller box 462. The connection may also be facilitated by one or more software entities. For example, the neural network may interact with a software driver that translates the commands/data it receives from the neural network into communications understood by the functional module, and vice versa (the neural network may similarly interact with an operating system that then interacts with driver). A power connection may also be mediated. For example, the neuromorphic apparatus may exert control over a simple device, such as an LED, by regulating power flow from a separate power supply module. Thus, in such an implementation, the neuromorphic apparatus never communicates directly (either in a data or power context) with the exemplary LED module, but rather controls it through the power supply.

At step 604 of the method 600, the neuromorphic apparatus 400 receives a state file (e.g. brain image) detailing a neural network mapping. The neuromorphic apparatus may receive the state file from either a PC or other computerized device managing the apparatus 400, or directly from a network repository of such state files (e.g. a cloud server hosting shared brain images) via e.g., Internet connectivity.

At step 606, the mapping detailed in the state file is applied to the neural network running on the neuromorphic apparatus. Applying the mapping changes the spatial relationships of the neurons modeled in the neural network, and consequently, the allowed activity states associated with the network change, effectively rewriting the brain. The functionality of the neural network may change accordingly.

This process may be used to add/remove the ability of the neural network to control specific devices as the robotic device is reconfigured. In some cases, a particular neuromorphic apparatus may not have the ability to control a device until it is either trained to do so, or a new neural network with such capabilities is loaded onto it.

Figure 7:
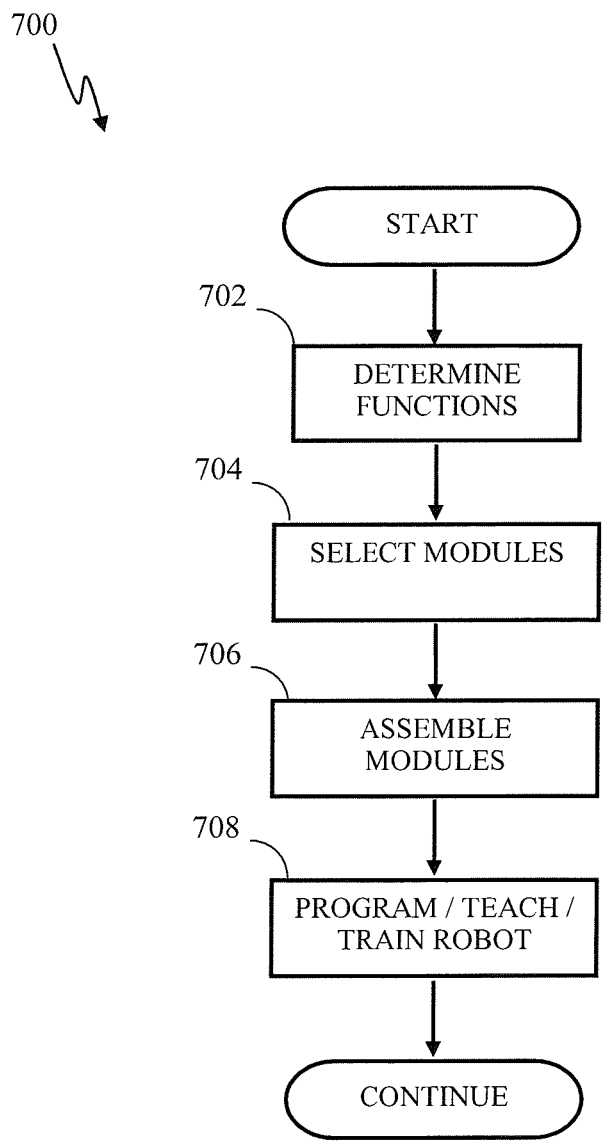
FIG. 7 is a logical flow diagram depicting a generalized method for configuring a robotic device consistent with some implementations.

FIG. 7 illustrates one implementation of a method of configuring a robotic apparatus. In the illustrated implementation, the method includes first determining one or more desired functions of the apparatus (step 702). For example, it may be desired to have a robot which can ambulate over generally flat terrain (e.g., indoors), and sense temperature or other environmental conditions. Once the desired functionality is known, a plurality of modules encompassing at least the desired one or more functions are selected per step 704. For example, the basic functions discussed above would require: (i) a controller; (ii) communications; (iii) data storage; (iv) electrical power supply; (v) a motive chassis or structure (e.g., motor driven wheels and some sort of steering capability), and (vi) one or more environmental sensors. As discussed above, these functions may be embodied in separate functional modules, or aggregated to various degrees (e.g., the controller and memory may be within a common module, as may the multiple environmental sensors).

Next, the selected modules are assembled into a desired configuration per step 706. The desired configuration may be dictated by environment or physical attributes desired (e.g., the ability to fit under furniture in a house, or fit through narrow substantially vertical openings, or have a low center of gravity for stability. Hence, the user under the present method can advantageously stack or mate the various modules in a large number of different configuration (consistent with maintaining the desired functions, such as not blocking the sensors from the ambient, or maintaining suitable ground clearance so as to maintain ambulatory capability for the robot.

Lastly, per step 708, the configured robot is programmed in order to utilize the one or more desired functions, such as by using the methods previously described herein (e.g., using the communications interface to download a "brain" image and update the neuronal network of the robotic apparatus with the image and state information.

Example Operation

Figure 8:
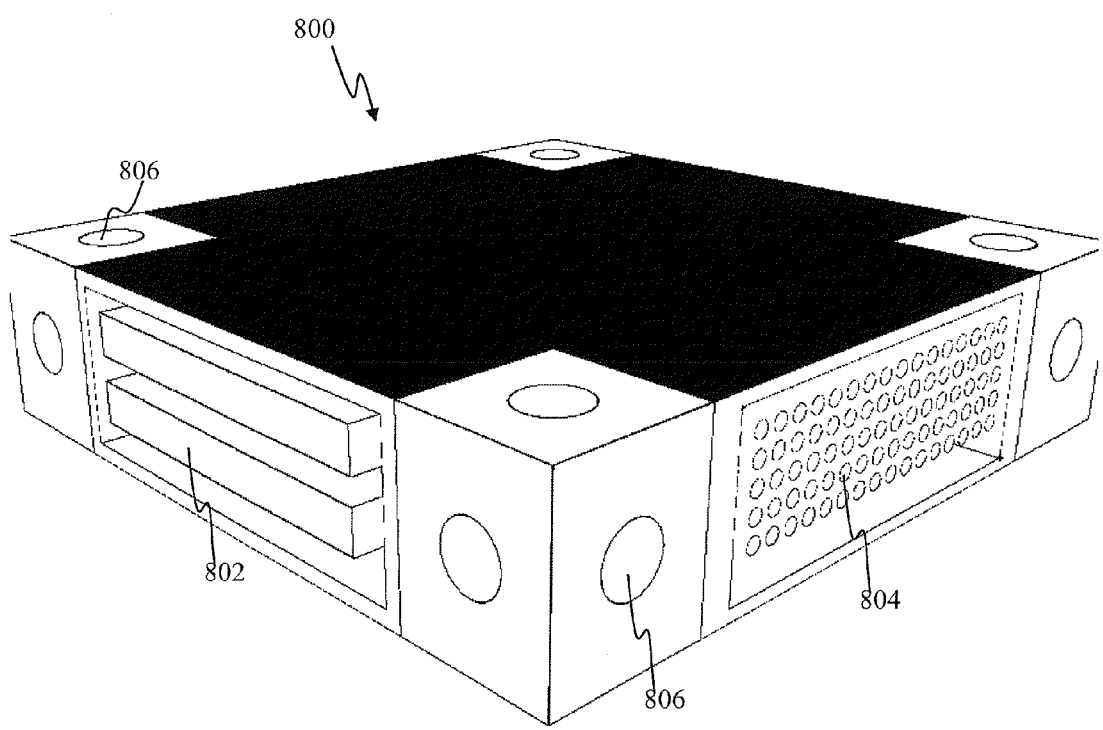
FIG. 8 is an illustration of an exemplary implementation of a bSTEM.

Referring now to FIG. 8, one exemplary implementation that pertains to a controller box for use in a toy construction set of interconnecting blocks is described.

In this exemplary implementation, an intelligent block, or bSTEM, containing processing units and memory is used to run a model of a neural network that in turn may be programmed or trained to control a robot fashioned out of the interconnecting blocks. FIG. 8 shows the exemplary bSTEM 700. The bSTEM in the illustrated implementation has dimensions of about 50.9×50.9×13 mm (2×2×0.5 in.) and has serial 802 and power 804 connections disposed on all sides. The serial and power connections may be used to connect the bSTEM to other functional modules (e.g. other bSTEMs for, inter alia, increased computational power or cooperative operation, sensor modules, servos/servo controllers, robotic appendages, heaters/coolers, power supplies/power management, memory/processing expansions, etc.). The bSTEM also includes wireless connectivity, such as via Bluetooth and/or Wi-Fi. A GPS or A-GPS or similar location or positioning receiver may also be provided (including via a separate add-on module).

The exemplary processing units include an APQ8060A processor. The processor may be configured to support single or multiple cores (e.g. dual-core or quad-core). The processor has a clock speed of about 1 GHz.

The memory includes roughly 1 Gbyte of RAM and 8 Gbytes of flash memory. The flash memory is configured to store the state of the neural network, software for running the neural network model, and software for interfacing with other modules (this may include driver software for various sensors). The state of the neural network may be saved as a brain image. The brain image is a spatial mapping of the positions and interconnections of the neurons/synapses in the model. The RAM supports the execution of the various software elements with fast paging access. Typically, the RAM and APQ8060A support the simulation of a network comprising thousands of neurons. Memory and processor expansion modules may be used to increase the number of neurons that may be simulated at one time.

The surface of the bSTEM includes numerous bosses/depressions 806 to facilitate interlocking with other blocks (e.g. LEGO, Mega Blok®, etc.). Referring again to FIG. 8, each of the corners of the device includes four bosses/depressions (one on each of the exposed faces). The corners snap into similar bosses/depressions on other blocks for physical stability.

The external faces also include serial 802 and power 804 ports. In this case, the faces include universal serial bus (USB) ports (e.g. USB 1.1/2.0/3.0, USB "on the go", etc.) which allow for both charging and serial transfer. Other ports, buses, or interfaces may included (e.g. Firewire, eSATA, Ethernet, etc.) for broad range compatibility. The connections are optionally ruggedized as discussed previously herein, such as to ensure that plugs do not loosen or fail under motion or normal stress. Further, a dedicated dc-in connection is available for situations in which USB-based charging is unavailable.

The bSTEM unit includes an internal low profile battery to support operation of at least the included processor and memory systems. However, the system is also configured to run on the power supplied via USB charging or via the DC-in connection. The battery may also supply to other modular units via the USB ports (two-way power negotiation may be supported). The serial connections support two-way data traffic and may be used to provide internet connectivity to the bSTEM. The battery used in the apparatus may comprise literally any type of rechargeable or replaceable battery, such as e.g., Lithium based.

In addition to wired connectivity, the bSTEM itself (or via supporting modules) optionally includes wireless network interfaces such as e.g., Bluetooth® and Wi-Fi. The bSTEM may establish a connection to a PC or other computing device (e.g. tablet, smartphone, etc). This connection may be direct (e.g. via Bluetooth, ad-hoc Wi-Fi, 802.16e) or it may be based on network infrastructure (e.g. via infrastructure Wi-Fi, Internet server). The bSTEM may achieve internet connectivity through the wireless interfaces if desired.

The connected PC (or other computing device) may be used to configure the bSTEM. To configure the bSTEM, the PC runs an application capable of interaction with the bSTEM. Implementations of such applications are described in co-owned U.S. Provisional Patent Application Ser. No. 61/654,738, filed on Jun. 1, 2012, entitled "NEURAL NETWORK LEARNING AND COLLABORATION APPARATUS AND METHODS", now U.S. patent application Ser. No. 13/830,398 filed on Mar. 14, 2013, entitled "NEURAL NETWORK LEARNING AND COLLABORATION APPARATUS AND METHODS" previously incorporated herein by reference. As discussed therein, a training application may include various submenus with tools for managing neural network based control devices. For example, in one exemplary implementation of such a training application, a user may access configuration options for their bSTEM through a Hygiene submenu. These configuration options may include connectivity options and brain image management.

The bSTEM may also be connected to various modular extensions via its on board data or signal ports and wireless interfaces. The modules may serve various purposes, such as adding sensory capabilities, user interfaces (e.g. touch screen displays, keypads, other human interface devices (HIDs)), displays, mechanical manipulation devices, ranging and detection, machine vision systems (e.g. Xbox Kinect®), power supply/management, audio input/output, computing expansions (as discussed above), etc. The modular devices may be added to the bSTEM, and software for interfacing with the module may be added through the serial and wireless interfaces on the bSTEM. Both remotely modules and modules disposed on the robotic device may be connected through the wireless interfaces. In some cases, the software for a particular module may already be present in the memory of the bSTEM.

Figure 9:
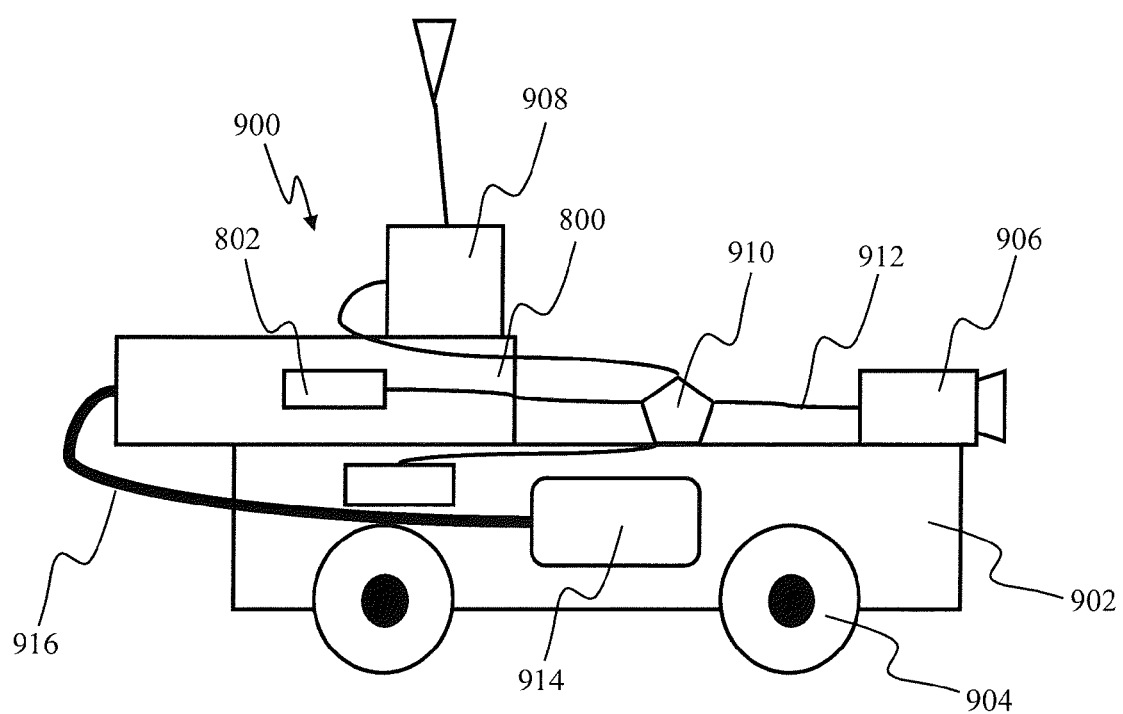
FIG. 9 is an illustration of an exemplary implementation of a robotic automobile.

Referring now to FIG. 9, an exemplary robotic automobile 900 based on the bSTEM 800 is shown (right side shown, the automobile is symmetric about the plane of the illustration). The bSTEM is affixed to a wheel base 902 using a LEGO pitch (not shown). The wheel base 902 includes four electric motors that drive wheels 904 on the sides of the wheel base. The automobile is steered by varying the speed at which the wheels turn with respect to each other. For example, if the wheels on the left side of the automobile are turned at half the speed of those on the right, the vehicle will veer to the left. Alternatively, wheels on opposite sides of the wheel base may be rotated in opposite directions to perform a stationary turn (i.e. with no forward or backward motion). A camera functional module 906 is attached to the front of the wheel based to allow for navigation. A radio box 908 (WI-FI/Bluetooth) to enhance the wireless range and power of the bSTEM (which has its own on-board wireless connectivity) is mounted on the pitch on the topside of the bSTEM 800. The functional modules 902, 906, 908 are in data communication with the bSTEM through its USB-family-compliant data port 802. The data port is wired to a USB hub 910 mounted on the top of the wheel base 902 which is connected via USB cable 912 to the other functional modules. The camera 906 and radio box 908 are powered via the USB connection. The wheel base is a dual use functional module in that it also contains a battery pack 914 and power output port. The wheel base directly powers the electric motors driving its wheels from the battery pack 914. Further, a power cable 916 plugs into the power port of the bSTEM 804. Via this connection, the battery pack 914 supplements the on-board power of the bSTEM allowing for longer operational lifetime (i.e. without charging) despite the bSTEM providing power to the camera 906 and radio box 908. The automobile may be expanded by adding new functional modules and current functional modules may be removed or replaced. For example, the camera functional module 906 may be supplemented or replaced by a second module based on ultrasonic echo-location. Similarly, the wheel base may be replaced by a base with tank tread. The bSTEM may be updated with new brain images are functional modules are added, removed, and/or replaced.

Skeletal hubs may also be optionally used to provide form to a robotic device based on the bSTEM. The exemplary skeletal hub plugs into one or more serial/power connections on the bSTEM, and other modules may be plugged into expansion bays on the skeleton. All bays are connected to the bSTEM bay via wiring (or wireless interface, such as short-range UWB high-bandwidth interfaces) internal to the skeletal hub. For example, a humanoid skeletal hub may have a bay for the bSTEM in its skull. Camera sensors are plugged into "eye socket" bays, and an expanded battery pack may be inserted into a bay disposed in the chest cavity of the humanoid skeletal hub. Servo motor expansions may be added to joints to facilitate appendage motion. Similarly, a vehicle-type (i.e. in the form of a car) skeletal hub may have bays for the bSTEM in the cabin of the vehicle, and a power supply expansion bay located in the engine block.

Exemplary Uses and Applications

Various aspects of the present disclosure may advantageously be applied to, inter alia, the design and operation of a neural network modeled on a neuromorphic apparatus, in order to aid in the integration, reconfigurability, and extensibility of functionality on a robotic device.

While such neuromorphic apparatus are especially useful with the extensible robots as described herein (e.g., by enabling more rapid integration of new features or behaviors by adding modules or rewriting brain images), it will be appreciated that the various aspects of the disclosure are in no way limited to such applications.

Advantageously, exemplary implementations of the present innovation are useful in a variety of devices including without limitation prosthetic devices, autonomous and robotic apparatus, and other electromechanical devices requiring sensory processing functionality. Examples of such robotic devises are manufacturing robots (e.g., automotive), military, medical (e.g. processing of microscopy, x-ray, ultrasonography, tomography). Examples of autonomous vehicles include rovers, unmanned air vehicles, underwater vehicles, smart appliances (e.g. ROOMBA®), etc.

Implementations of the principles of the disclosure are applicable to video data compression and processing in a wide variety of stationary and portable devices, such as, for example, smart phones, portable communication devices, notebook, netbook and tablet computers, surveillance camera systems, and practically any other computerized device configured to process vision data.

Implementations of the principles of the disclosure are further applicable to a wide assortment of applications including computer human interaction (e.g., recognition of gestures, voice, posture, face, etc.), controlling processes (e.g., an industrial robot, autonomous and other vehicles), augmented reality applications, organization of information (e.g., for indexing databases of images and image sequences), access control (e.g., opening a door based on a gesture, opening an access way based on detection of an authorized person), detecting events (e.g., for visual surveillance or people or animal counting, tracking), data input, financial transactions (payment processing based on recognition of a person or a special payment symbol) and many others.

The techniques and architectures of the disclosure may be used to achieve adaptive automated building management. Control of lighting, safety and heating/cooling may be improved by adaptive systems such as those discussed herein. In changing climates and in cases of unexpected emergencies an adaptive system provides more tailored assistance. For example, rather than automatically locking all doors heading inward in a building during a fire emergency, an adaptive system may be trained to ensure all persons still inside the still have a safe route out and that locking the doors in this manner does not impede their escape.

Implementations of the principles of the disclosure are further applicable to training coordinated operations of automated devices. For example, in applications such as unexploded ordinance/improvised explosive device location and removal, a coordinated search pattern between multiple autonomous learning devices leads to more efficient area coverage. Further, learning devices offer the flexibility to handle wider (and dynamic) variety of explosive device encounters. Alternatively such learning devices are also easily trained to identify targets (e.g. enemy vehicles) and deliver similar explosives.

Advantageously, the various methods and apparatus of the disclosure can be used to simplify tasks related to motion estimation, such as where an image sequence is processed to produce an estimate of the object position (and hence velocity), either at each point in the image or in the 3D scene, or even of the camera that produces the images. Examples of such tasks are: ego motion, i.e., determining the three-dimensional rigid motion (rotation and translation) of the camera from an image sequence produced by the camera; following the movements of a set of interest points or objects (e.g., vehicles or humans) in the image sequence and with respect to the image plane.

In another approach, portions of the object recognition system are embodied in a remote server, comprising a computer readable apparatus storing computer executable instructions configured to perform pattern recognition in data streams for various applications, such as scientific, geophysical exploration, surveillance, navigation, data mining (e.g., content-based image retrieval). Myriad other applications exist that will be recognized by those of ordinary skill given the present disclosure.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure presented herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles and architectures described herein. This description is in no way meant to be limiting, but rather should be taken as illustrative of the general principles of the disclosure. The scope of the invention should be determined with reference to the claims.

What is claimed is:

1. A computerized neuromorphic apparatus, comprising:
at least one mount configured to physically secure the computerized neuromorphic apparatus inside a robotic device;
a storage device configured to store a plurality of network image files, each network image file specifying an artificial neural network corresponding to a finite state machine in a particular configuration; and
a processor in data communication with the storage device, the processor configured to run at least one computer program thereon, the computer program comprising a plurality of instructions configured to, when executed:
access at least one network image file from the plurality of network image files;
based at least in part on the at least one network image file, load the state of the neural network; and
send a command to a modular robotic component based at least in part on a subsequent state evolution of the loaded neural network;

wherein the command is configured to initiate at least a control loop, an estimation loop, or combination thereof.

2. The computerized neuromorphic apparatus of claim 1, wherein at least the control loop, the estimation loop, or the combination thereof has at least one associated period and is executed within at least one associated execution window.

3. The computerized neuromorphic apparatus of claim 2, wherein the at least one associated period and the at least one associated execution window are effected via an oscillator associated with the processor.

4. The computerized neuromorphic apparatus of claim 2, wherein at least the control loop, the estimation loop, or the combination thereof are executed in real-time.

5. The computerized neuromorphic apparatus of claim 1, wherein the artificial neural network specification comprises neuron state information; at least one mapping between neurons within the network, mapping between inputs and neurons within the network, mapping between neurons within the network and modules receiving outputs from the network, or a combination thereof; and weights associated with the mapping.

6. The computerized neuromorphic apparatus of claim 1, wherein the modular robotic component comprises at least a sensor, a power pack, a controller, a motor drive, or a combination thereof.

7. A method for use in expanding a functionality of a robotic apparatus, the method comprising:
    establishing a connection to a modular robotic component via a data interface;
    receiving a network image file comprising a first mapping of a first artificial neural network for the modular robotic component; and
    applying a second mapping of a plurality of neurons from a modeled artificial neural network to a plurality of inputs of the first mapping, the second mapping being applied to enable control of the modular robotic component, such that a second artificial neural network is generated by merging the first mapping and the second mapping.

8. A method for use in expanding a functionality of a robotic apparatus, the method comprising:
    establishing a connection to a modular robotic component via a data interface;
    receiving a network image file comprising a first mapping of a first artificial neural network for the modular robotic component; and
    applying a second mapping of a plurality of neurons from a modeled artificial neural network to a plurality of inputs of the first mapping, the second mapping being applied to enable control of the modular robotic component, such that a second, artificial neural network is generated by inserting at least a connection, a neuron, or combination thereof from the second mapping into the first mapping.

9. A non-transitory computer readable apparatus configured to store at least one computer program thereon, the at least one computer program comprising a plurality of instructions configured to, when executed:
    load one of a plurality of simulated neural network image files onto a neuromorphic apparatus, each simulated neural network image file specifying an artificial neural network corresponding to a finite state machine in a particular configuration;
    establish connections to a plurality of robotic components via at least one data interface;
    detect an activity state of the simulated neural network related to at least one of the plurality of robotic components; and
    transmit a command to the at least one of the plurality of robotic components, the command being based at least in part on the activity state of the simulated neural network, the at least one of the plurality of robotic components comprising a software element, and the command being configured to cause the software element to perform a complex estimation task.

* * * * *